(12) United States Patent
Román

(10) Patent No.: US 7,233,619 B1
(45) Date of Patent: Jun. 19, 2007

(54) VARIABLE GENERAL PURPOSE COMPRESSION FOR VIDEO IMAGES (ZLN)

(76) Inventor: Kendyl A. Román, 730 Bantry Ct., Sunnyvale, CA (US) 94087-3402

( * ) Notice: Subject to any disclaimer, the term of this patent is extended or adjusted under 35 U.S.C. 154(b) by 0 days.

(21) Appl. No.: 09/467,721

(22) Filed: Dec. 20, 1999

Related U.S. Application Data

(60) Provisional application No. 60/113,051, filed on Dec. 21, 1998.

(51) Int. Cl.
*H04B 1/66* (2006.01)
(52) U.S. Cl. ............ 375/240; 375/240.23; 375/240.21; 375/240.26; 382/245; 382/246; 382/235
(58) Field of Classification Search ................ 375/240, 375/240.25, 240.21, 240.26, 240.23; 348/420, 348/405, 384, 390, 423, 409, 395, 401–404, 348/416–418, 419, 408, 422, 699, 698, 421; 382/248, 232, 237, 245, 244, 246, 235
See application file for complete search history.

(56) References Cited

U.S. PATENT DOCUMENTS

| | | | |
|---|---|---|---|
| 4,301,469 A | 11/1981 | Modeen et al. ............... 358/75 |
| 4,302,775 A | 11/1981 | Widergren et al. ......... 358/136 |
| 4,385,363 A | 5/1983 | Widergren et al. ......... 364/725 |
| 4,394,774 A | 7/1983 | Widergren et al. ........... 382/56 |
| 4,410,916 A | 10/1983 | Pratt et al. .................... 358/263 |
| 4,546,385 A * | 10/1985 | Anastassiou ............. 348/390.1 |
| 4,646,356 A | 2/1987 | Anderson et al. ............. 382/56 |
| 4,698,672 A | 10/1987 | Chen et al. .................. 358/136 |
| 4,704,628 A | 11/1987 | Chen et al. .................. 358/136 |
| 4,743,959 A * | 5/1988 | Frederiksen ........... 375/240.25 |
| 5,014,710 A | 5/1991 | Maslak et al. .......... 128/660.05 |
| 5,046,027 A | 9/1991 | Taaffe et al. |
| 5,047,853 A | 9/1991 | Hoffert et al. .............. 358/133 |
| 5,271,072 A * | 12/1993 | Yoshida et al. ............. 382/247 |
| 5,309,232 A * | 5/1994 | Hartung et al. ............. 348/384 |
| 5,416,602 A | 5/1995 | Inga et al. ................... 358/403 |
| 5,471,989 A | 12/1995 | Roundhill et al. ...... 128/660.04 |
| 5,552,832 A * | 9/1996 | Astle .......................... 348/420 |
| 5,581,613 A | 12/1996 | Nagashima et al. ........ 380/201 |
| 5,619,995 A | 4/1997 | Lobodzinski |
| 5,621,660 A * | 4/1997 | Chaddha et al. ............ 709/247 |
| 5,646,618 A * | 7/1997 | Walsh ......................... 341/67 |
| 5,715,823 A | 2/1998 | Wood et al. ............ 128/660.01 |
| 5,812,119 A | 9/1998 | Tateyama ................... 345/202 |
| 5,812,788 A * | 9/1998 | Agarwal ...................... 348/405 |
| 5,882,206 A | 3/1999 | Gillio ........................... 434/262 |
| 5,897,498 A | 4/1999 | Canfield, II et al. ........ 600/437 |
| 5,920,317 A | 7/1999 | McDonald .................. 345/853 |
| 5,999,655 A | 12/1999 | Kalker et al. ............... 382/234 |
| 6,005,979 A * | 12/1999 | Chang et al. ............... 382/232 |

(Continued)

FOREIGN PATENT DOCUMENTS

WO   WO 99/59472   11/1999

*Primary Examiner*—Shawn S. An

(57) ABSTRACT

Methods, medium, and machines which compress, enhance, encode, transmit, decompress and display digital video images in real time. Real time compression is achieved by sub-sampling each frame of a video signal, filtering the pixel values, and encoding. Real time transmission is achieved due to high levels of effective compression. Real time decompression is achieved by decoding and decompressing the encoded data to display high quality images. Receiver can alter various setting including but not limited to the format for the compression, image size, frame rate, brightness and contrast.

20 Claims, 23 Drawing Sheets

U.S. PATENT DOCUMENTS

| | | | |
|---|---|---|---|
| 6,009,346 A | 12/1999 | Ostrow | 604/20 |
| 6,054,990 A | 4/2000 | Tran | 345/358 |
| 6,058,215 A * | 5/2000 | Schwartz et al. | 382/244 |
| 6,063,032 A | 5/2000 | Grunwald | 600/440 |
| 6,064,324 A * | 5/2000 | Shimizu et al. | 348/405 |
| 6,078,691 A | 6/2000 | Luttmer | 382/235 |
| 6,091,777 A | 7/2000 | Guetz et al. | 375/240 |
| 6,115,485 A | 9/2000 | Dumoulin et al. | 382/128 |
| 6,181,711 B1 | 1/2001 | Zhang et al. | 370/468 |
| 6,219,358 B1 * | 4/2001 | Pinder et al. | 348/423 |
| 6,335,990 B1 | 1/2002 | Chen et al. | 382/261 |
| 6,339,616 B1 | 1/2002 | Kovalev | 375/240.16 |
| 6,384,862 B1 * | 5/2002 | Brusewitz et al. | 348/211.99 |
| 6,574,278 B1 * | 6/2003 | McVeigh et al. | 375/240.18 |
| 2001/0021260 A1 | 9/2001 | Chung et al. | 382/100 |

* cited by examiner

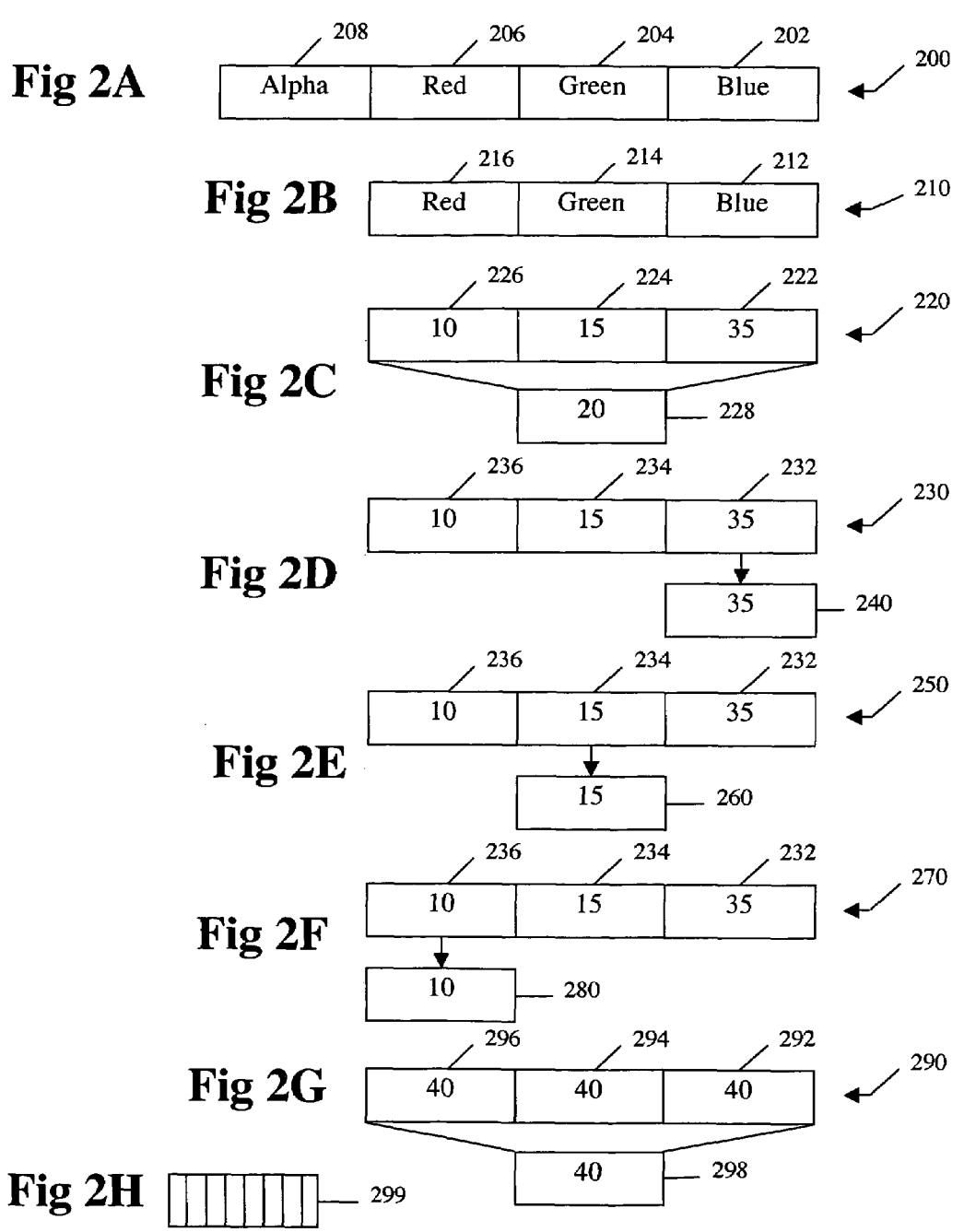

RHN FORMAT

ZL3 (ZL3-5): 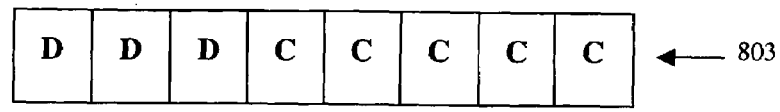 ← 803
ZL4 (ZL4-4): 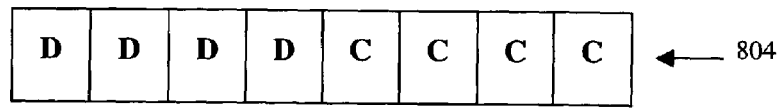 ← 804
ZL5 (ZL5-3): 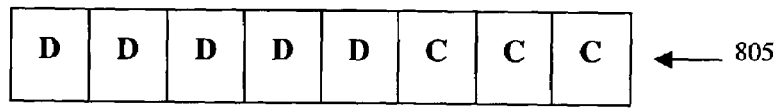 ← 805
ZL8 (ZL8-8): 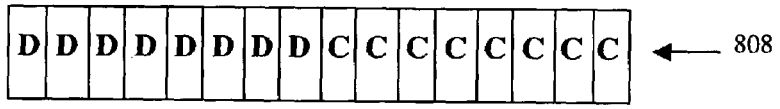 ← 808
ZL9 (ZL9-7): 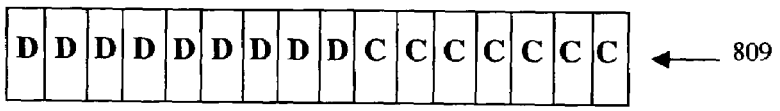 ← 809
ZL12 (ZL12-4): 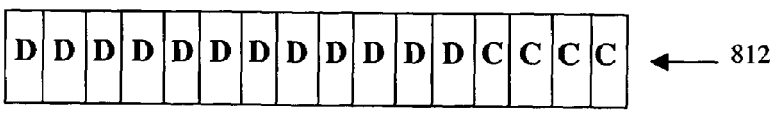 ← 812
Fig 8A

```
// N=3, W=8
unsigned char encodeTable[ ] =
{
      5, 0, 7, 4, 2, 3, 6, 1
};
```

Fig 11A

```
// N=3, U=5
int decodeTable[ ] =
{
      0xff << 24 | 1 << (16+U) | 1 << (8+U) | 1 << U,  // 0 → 1
      0xff << 24 | 7 << (16+U) | 7 << (8+U) | 7 << U,  // 1 → 7
      0xff << 24 | 4 << (16+U) | 4 << (8+U) | 4 << U,  // 2 → 4
      0xff << 24 | 5 << (16+U) | 5 << (8+U) | 5 << U,  // 3 → 5
      0xff << 24 | 3 << (16+U) | 3 << (8+U) | 3 << U,  // 4 → 3
      0xff << 24 | 0 << (16+U) | 0 << (8+U) | 0 << U,  // 5 → 0
      0xff << 24 | 6 << (16+U) | 6 << (8+U) | 6 << U,  // 6 → 6
      0xff << 24 | 2 << (16+U) | 2 << (8+U) | 2 << U   // 7 → 2
};
```

Fig 11B

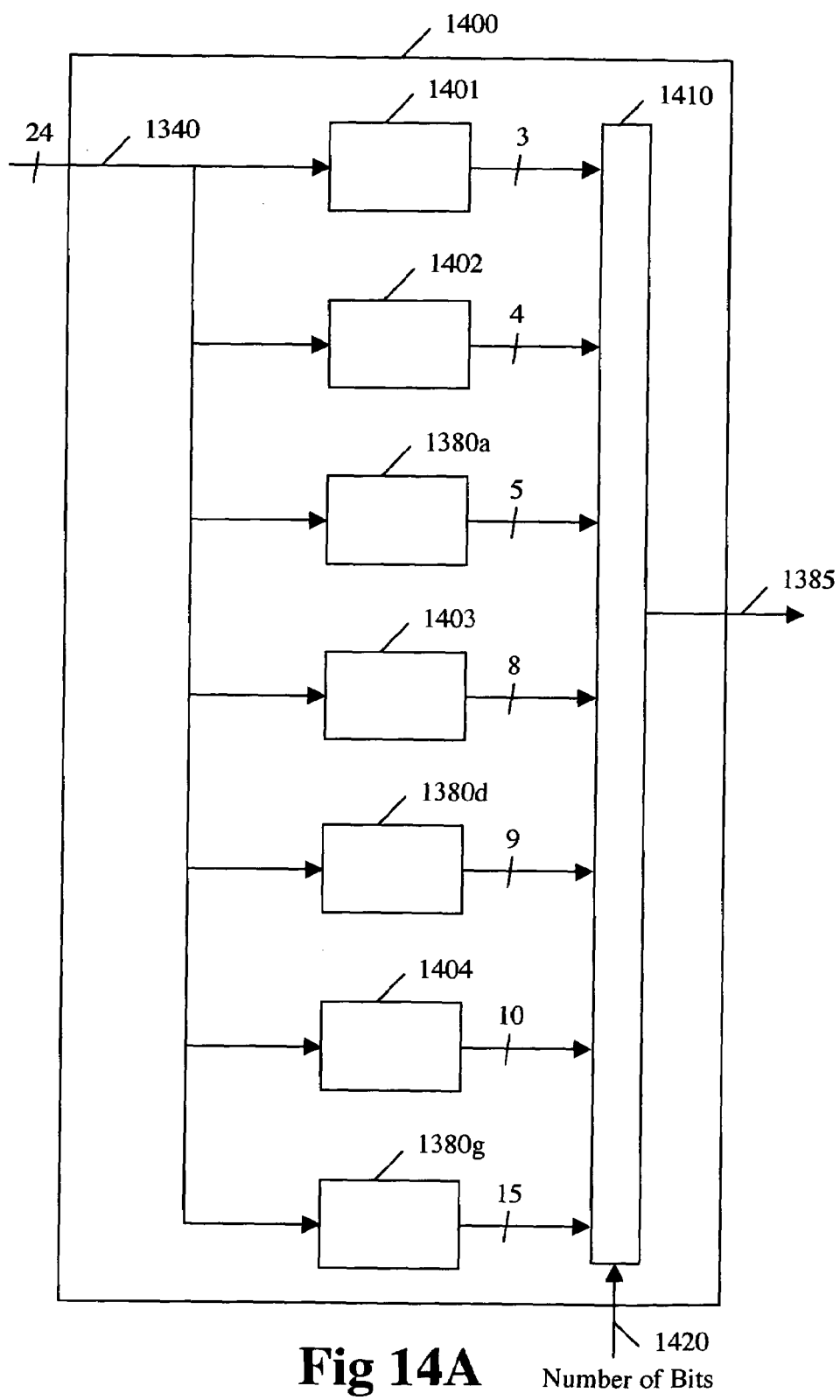
Fig 14A   Number of Bits

VARIABLE GENERAL PURPOSE COMPRESSION FOR VIDEO IMAGES (ZLN)

CROSS-REFERENCE TO RELATED APPLICATIONS

This application claims priority under 35 U.S.C. § 119(e) of the co-pending U.S. provisional application Ser. No. 60/113,051 filed on 1998 Dec. 21, and entitled "METHODS OF ZERO LOSS (ZL) COMPRESSION AND ENCODING OF GRAY SCALE IMAGES." The provisional application Ser. No. 60/113,051 filed on 1998 Dec. 21 and entitled "METHODS OF ZERO LOSS (ZL) COMPRESSION AND ENCODING OF GRAYSCALE IMAGES" is also hereby incorporated by reference.

A U.S. patent application Ser. No. 09/470,566, filed on 1999 Dec. 22, and entitled GENERAL PURPOSE COMPRESSION FOR VIDEO IMAGES (RHN)", known as the "RHN" algorithm, now U.S. Pat. No. 7,016,417, has claims that combine some of the elements of the present invention in a different combination. The RHN application claims a priority date based on a co-pending U.S. provisional application Ser. No. 60/113,276 filed on 1998 Dec. 23. The provisional application Ser. No. 60/113,276 filed on 1998 Dec. 23 is also hereby incorporated by reference. The application Ser. No. 09/470,566, filed on 1999 Dec. 22, and entitled GENERAL PURPOSE COMPRESSION FOR VIDEO IMAGES (RHN)" as amended is also hereby incorporated by reference.

My co-pending U.S. patent application Ser. No. 09/312,922 filed on 1999 May 17, and entitled "SYSTEM FOR TRANSMITTING VIDEO IMAGES OVER A COMPUTER NETWORK TO A REMOTE RECEIVER" describes an embodiment of the invention of the RHN method, as well as a system for practicing the compression method. U.S. patent application Ser. No. 90/312,922, filed on 1999 May 17, and entitled "SYSTEM FOR TRANSMITTING VIDEO IMAGES OVER A COMPUTER NETWORK TO A REMOTE RECEIVER" is also hereby incorporated by reference.

My co-pending U.S. patent application, Ser. No. 09/473,190, filed on 1999 Dec. 1, and entitled "ADDING DOPPLER ENHANCEMENT TO GRAYSCALE COMPRESSION (ZLD)" describes an invention that is related to this application. U.S. patent application Ser. No. 09/473,190, filed on 1999 Dec. 1, and entitled "ADDING DOPPLER ENHANCEMENT TO GRAYSCALE COMPRESSION (ZLD)" as amended is also hereby incorporated by reference. A continuation in part of this application entitled, "Handheld Video Transmission and Display," application number 11/262106, was published as U.S. 2006/0114987, and provides more detailed descriptions of FIGS. 12-18 which are included herein by reference.

BACKGROUND

1. Field of the Invention

This invention relates to data compression, specifically to the compression and decompression of video images.

BACKGROUND

2. Description of Prior Art

In the last few years, there have been tremendous advances in the speed of computer processors and in the availability of bandwidth of worldwide computer networks such as the Internet. These advances have led to a point where businesses and households now commonly have both the computing power and network connectivity necessary to have point-to-point digital communications of audio, rich graphical images, and video. However the transmission of video signals with the full resolution and quality of television is still out of reach. In order to achieve an acceptable level of video quality, the video signal must be compressed significantly without losing either spatial or temporal quality.

A number of different approaches have been taken but each has resulted in less than acceptable results. These approaches and their disadvantages are disclosed by Mark Nelson in a book entitled *The Data Compression Book, Second Edition*, published by M&T Book in 1996. Mark Morrision also discusses the state of the art in a book entitled *The Magic of Image Processing*, published by Sams Publishing in 1993.

Video Signals

Standard video signals are analog in nature. In the United States, television signals contain 525 scan lines of which 480 lines are visible on most televisions. The video signal represents a continuous stream of still images, also known as frames, that are fully scanned, transmitted and displayed at a rate of 30 frames per second. This frame rate is considered full motion.

A television screen has a 4:3 aspect ratio.

When an analog video signal is digitized each of the 480 lines are sampled 640 times, and each sample is represented by a number. Each sample point is called a picture element, or pixel. A two dimensional array is created that is 640 pixels wide and 480 pixels high. This 640×480 pixel array is a still graphical image that is considered to be full frame. The human eye can perceive 16.7 thousand colors. A pixel value comprised of 24 bits can represent each perceivable color. A graphical image made up of 24 bit pixels is considered to be full color. A single, second-long, full frame, full color video requires over 220 millions bits of data.

The transmission of 640×480 pixels×24 bits per pixel times 30 frames requires the transmission of 221,184,000 millions bits per second. A T1 Internet connection can transfer up to 1.54 millions bits per second. A high speed (56 Kb) modem can transfer data at a maximum rate of 56 thousand bits per second. The transfer of full motion, full frame, full color digital video over a T1 Internet connection, or 56 Kb modem, will require an effective data compression of over 144:1, or 3949:1, respectively.

A video signal typically will contain some signal noise. In the case where the image is generated based on sampled data, such as an ultrasound machine, there is often noise and artificial spikes in the signal. A video signal recorded on magnetic tape may have fluctuations due the irregularities in the recording media. Florescent or improper lighting may cause a solid background to flicker or appear grainy. Such noise exists in the real world but may reduce the quality of the perceived image and lower the compression ratio that could be achieved by conventional methods.

Basic Run-Length Encoding

An early technique for data compression is run-length encoding where a repeated series of items are replaced with one sample item and a count for the number of times the sample repeats. Prior art shows run-length encoding of both individual bits and bytes. These simple approaches by themselves have failed to achieve the necessary compression ratios.

Variable Length Encoding

In the late 1940s, Claude Shannon at Bell Labs and R. M. Fano at MIT pioneered the field of data compression. Their work resulted in a technique of using variable length codes where codes with low probabilities have more bits, and codes with higher probabilities have fewer bits. This approach requires multiple passes through the data to determine code probability and then to encode the data. This approach also has failed to achieve the necessary compression ratios.

D. A. Huffman disclosed a more efficient approach of variable length encoding known as Huffman coding in a paper entitled "A Method for Construction of Minimum Redundancy Codes," published in 1952. This approach also has failed to achieve the necessary compression ratios.

Arithmetic, Finite Context, and Adaptive Coding

In the 1980s, arithmetic, finite coding, and adaptive coding have provided a slight improvement over the earlier methods. These approaches require extensive computer processing and have failed to achieve the necessary compression ratios.

Dictionary-Based Compression

Dictionary-based compression uses a completely different method to compress data. Variable length strings of symbols are encoded as single tokens. The tokens form an index to a dictionary. In 1977, Abraham Lempel and Jacob Ziv published a paper entitled, "A Universal Algorithm for Sequential Data Compression" in IEEE Transactions on Information Theory, which disclosed a compression technique commonly known as LZ77. The same authors published a 1978 sequel entitled, "Compression of Individual Sequences via Variable-Rate Coding," which disclosed a compression technique commonly known as LZ78 (see U.S. Pat. No. 4,464,650). Terry Welch-published an article entitled, "A Technique for High-Performance Data Compression," in the June 1984 issue of IEEE Computer, which disclosed an algorithm commonly known as LZW, which is the basis for the GIF algorithm (see U.S. Pat. Nos. 4,558,302, 4,814,746, and 4,876,541). In 1989, Stack Electronics implemented a LZ77 based method called QIC-122 (see U.S. Pat. No. 5,532,694, U.S. Pat. No. 5,506,580, and U.S. Pat. No. 5,463,390).

These lossless (method where no data is lost) compression methods can achieve up to 10:1 compression ratios on graphic images typical of a video image. While these dictionary-based algorithms are popular, these approaches require extensive computer processing and have failed to achieve the necessary compression ratios.

JPEG and MPEG

Graphical images have an advantage over conventional computer data files: they can be slightly modified during the compression/decompression cycle without affecting the perceived quality on the part of the viewer. By allowing some loss of data, compression ratios of 25:1 have been achieved without major degradation of the perceived image. The Joint Photographic Experts Group (JPEG) has developed a standard for graphical image compression. The JPEG lossy (method where some data is lost) compression algorithm first divides the color image into three color planes and divides each plane into 8 by 8 blocks, and then the algorithm operates in three successive stages:

(a) A mathematical transformation known as Discrete Cosine Transform (DCT) takes a set of points from the spatial domain and transforms them into an identical representation in the frequency domain.

(b) A lossy quantization is performed using a quantization matrix to reduce the precision of the coefficients.

(c) The zero values are encoded in a zig-zag sequence (see Nelson, pp. 341–342).

JPEG can be scaled to perform higher compression ratio by allowing more loss in the quantization stage of the compression. However this loss results in certain blocks of the image being compressed such that areas of the image have a blocky appearance and the edges of the 8 by 8 blocks become apparent because they no longer match the colors of their adjacent blocks. Another disadvantage of JPEG is smearing. The true edges in an image get blurred due to the lossy compression method.

The Moving Pictures Expert Group (MPEG) uses a combination of JPEG based techniques combined with forward and reverse temporal differencing. MPEG compares adjacent frames and for those blocks that are identical to those in a previous or subsequent frame and only a description of the previous or subsequent identical block is encoded. MPEG suffers from the same blocking and smearing problems as JPEG.

These approaches require extensive computer processing and have failed to achieve the necessary compression ratios without unacceptable loss of image quality and artificially induced distortion.

QuickTime: CinePak, Sorensen, H.263

Apple Computer, Inc. released a component architecture for digital video compression and decompression, named QuickTime. Any number of methods can be encoded into a QuickTime compressor/decompressor (codec). Some popular codec are CinePak, Sorensen, and H.263. CinePak and Sorensen both require extensive computer processing to prepare a digital video sequence for playback in real time; neither can be used for live compression. H.263 compresses in real time but does so by sacrificing image quality resulting in severe blocking and smearing.

Fractal and Wavelet Compression

Extremely high compression ratios are achievable with fractal and wavelet compression algorithms. These approaches require extensive computer processing and generally cannot be completed in real time.

Sub-Sampling

Sub-sampling is the selection of a subset of data from a larger set of data. For example, when every other pixel of every other row of a video image is selected, the resulting image has half the width and half the height.

Image Stretching

If an image is to be enlarged but maintain the same number of pixels per inch, data must be filled in the new pixels that are added. Various methods of stretching an imaging and filling in the new pixels to maintain image consistency. Some methods known in the art are dithering (using adjacent colors that appear to be blended color), and error diffusion, "nearest neighbor", bilinear and bicubic.

SUMMARY OF THE INVENTION

In accordance with the present invention a method of compression of a video stream comprises steps of sub-sampling a video frame, and run-length encoding the sub-sampled pixel values, whereby the method can be executed in real time and the compressed representation of pixels saves substantial space on a storage medium and require substantially less time and bandwidth to be transported over a communications link. The present invention includes a corresponding method for decompressing the encoded data.

Objects and Advantages

Accordingly, beside the objects and advantages of the method described in our patent above, some additional objects and advantages of the present invention are:

(a) to provide a method of compressing and decompressing video signals so that the video information can be transported across a digital communications channel in real time.
(b) to provide a method of compressing and decompressing video signals such that compression can be accomplished with software on commercially available computers without the need for additional hardware for either compression or decompression.
(c) to provide a high quality video image without the blocking and smearing defects associated with prior art lossy methods.
(d) to provide a high quality video image that suitable for use in medical applications.
(e) to enhance images by filtering noise or recording artifacts.
(f) to provide a method of compression of video signals such that the compressed representation of the video signals is substantially reduced in size for storage on a storage medium.
(g) to provide a level of encryption so that images are not directly viewable from the data as contained in the transmission.

DRAWING FIGURES

In the drawings, closely related figures have the same number but different alphabetic suffixes.

FIGS. 2A to 2H show alternatives for selecting a pixel value for encoding.

FIG. 8A shows examples of variable formats.

FIGS. 11A and 11B show an encryption table and a decryption table.

FIGS. 14A through 14C shows embodiments of a machine element for variably altering the number of bits.

Figure 1:
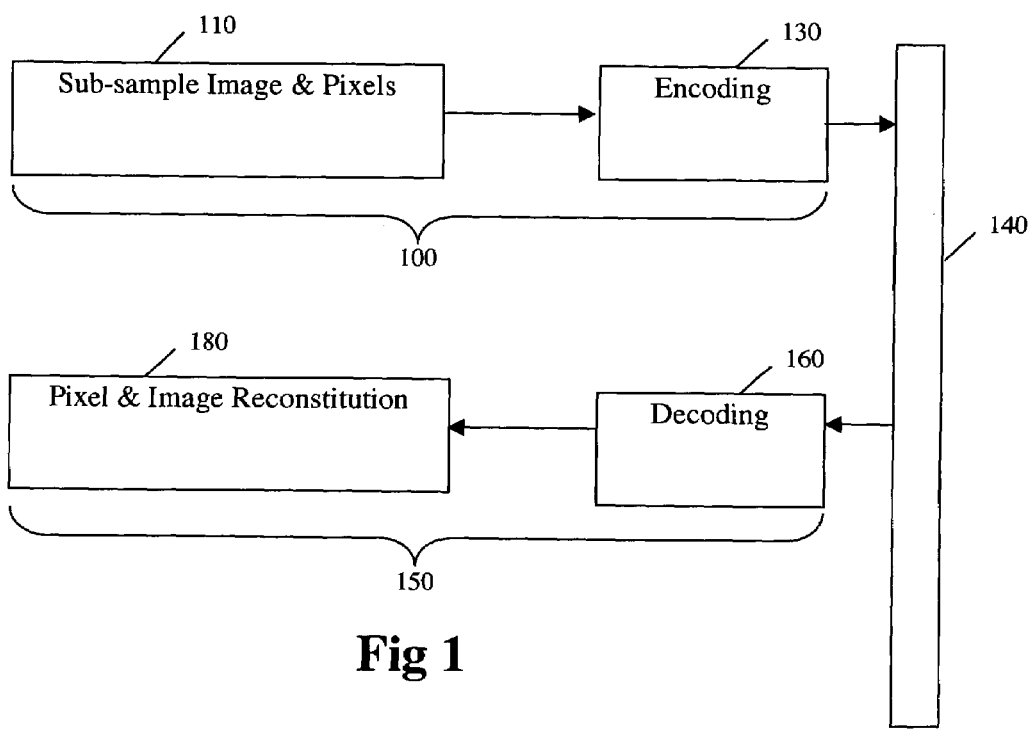
FIG. 1 shows the high level steps of compression and decompression of an image.

| | Reference Numerals in Drawings | | |
|---|---|---|---|
| 100 | compression steps | 110 | sub-sampling step |
| 130 | encoding step | | |
| 140 | encoded data | 150 | decompression steps |
| 160 | decoding step | 180 | image reconstitution step |
| 200 | 32 bit pixel value | | |
| 202 | blue channel | 204 | green channel |
| 206 | red channel | 208 | alpha channel |
| 210 | 24 bit pixel value | 212 | blue component |
| 214 | green component | 216 | red component |
| 220 | RGB averaging diagram | 222 | blue value |
| 224 | green value | 226 | red value |
| 228 | averaged value | 230 | blue selection diagram |
| 232 | blue instance | 234 | green instance |
| 236 | red instance | 240 | selected blue value |
| 250 | green selection diagram | 260 | selected green value |
| 270 | red selection diagram | 280 | selected red value |
| 290 | grayscale pixel | 292 | grayscale blue |
| 294 | grayscale green | 296 | grayscale red |
| 298 | selected grayscale value | 299 | filtered pixel value |
| 300 | N | 301 | U |
| 302 | W | 310 | pixel bit 7 |
| 312 | pixel bit 6 | 314 | pixel bit 5 |
| 316 | pixel bit 4 | 318 | pixel bit 3 |
| 320 | pixel bit 2 | 322 | pixel bit 1 |

-continued

| | Reference Numerals in Drawings | | |
|---|---|---|---|
| 324 | pixel bit 0 | 325 | 8 bit pixel |
| 330 | 5 bit sample | | |
| 332 | sample bit 4 | 334 | sample bit 3 |
| 336 | sample bit 2 | 338 | sample bit 1 |
| 340 | sample bit 0 | 350 | 3 low order bits |
| 360 | formatted code | 380 | 3 bit count value |
| 400 | encode flowchart | | |
| 402 | encode entry | 403 | encode initialization step |
| 404 | get pixel step | 405 | get value step |
| 406 | lookup encoded value step | 408 | compare previous |
| 410 | increment counter step | 412 | check count overflow |
| 414 | new code step | 416 | check end of data |
| 418 | set done | 420 | counter overflow step |
| 422 | check done | 428 | encode exit |
| 430 | image | 440 | image width |
| 450 | image height | 460 | pixel stream |
| 500 | code byte | 510 | flag bit |
| 520 | repeat code | 530 | count |
| 550 | data code | 560 | wasted bits |
| 565 | data bit 6 | | |
| 570 | data bit 5 | 575 | data bit 4 |
| 580 | data bit 3 | 585 | data bit 2 |
| 590 | data bit 1 | 595 | data bit 0 |
| 610 | decimal values | 620 | first value |
| 622 | second value | 624 | third value |
| 626 | fourth value | 628 | fifth value |
| 630 | sixth value | 632 | seventh value |
| 640 | binary code | 650 | first byte |
| 651 | first data | 652 | first count |
| 653 | second byte | 654 | second data |
| 655 | second count | 656 | third byte |
| 657 | third data | 658 | third count |
| 740 | RHN binary code | 803 | ZL3 format |
| 804 | ZL4 format | 805 | ZL5 format |
| 808 | ZL8 format | 809 | ZL9 format |
| 812 | ZL12 format | 820 | ZL9C format |
| 900 | decode entry | 901 | decode initialize step |
| 902 | get code step | 908 | decode lookup step |
| 909 | check zero count | 910 | place pixel step |
| 914 | reset counter step | 916 | check length |
| 918 | decode exit | 1000 | encryption key |
| 1010 | first adjacent pixel | 1012 | second adjacent pixel |
| 1010 | first subsequent adjacent pixel | 1012 | second subsequent adjacent pixel |
| 1052, 1054, 1056, 1058, 1060 | | | interpolated pixels |
| 1100 | encryption table | 1110 | decryption table |
| 1200 | video frames | | |
| 1205a | first video frame | | |
| 1205b | second video frame | | |
| 1205n | nth video frame | | |
| 1210 | compressor | | |
| 1215 | video signal | | |
| 1220 | series of encoded data | | |
| 1225 | encoded data buffer | | |
| 1225a | first encoded data | | |
| 1225b | second encoded data | | |
| 1225n | nth encoded data | | |
| 1230a | first received encoded data | | |
| 1230b | second received encoded data | | |
| 1230n | nth received encoded data | | |
| 1238 | received encoded data | | |
| 1235 | encoded data stream | | |
| 1240 | I/O device | | |
| 1245 | input encoded data stream | | |
| 1250 | decompressor | | |
| 1260a | first decoded video frame | | |
| 1260b | second decoded video frame | | |
| 1260n | nth decoded video frame | | |
| 1268 | decoded video frames | | |
| 1270 | video sequence | | |
| 1280 | storage medium | | |
| 1290 | communications channel | | |
| 1310 | video digitizer | | |
| 1320 | path 1320 | | |
| 1330 | video memory | | |
| 1331 | scan | | |
| 1332 | pixel index | | |
| 1340 | path 1340 | | |

-continued

| Reference Numerals in Drawings | |
|---|---|
| 1350 | encoding circuit |
| 1360 | path 1360 |
| 1370 | encoded data |
| 1380 | pixel sub-sampler |
| 1380a | 24 to 5 bit sub-sampler |
| 1380b | 24-bit RGB to 5 bit sub-sampler |
| 1380c | 32-bit RGB to 5 bit sub-sampler |
| 1380d | color 9-bit sub-sampler |
| 1380e | YUV sub-sampler |
| 1380f | 36-bit RGB to 24-bit sub-sampler |
| 1380g | 15-bit sub-sampler |
| 1382 | pixel extractor |
| 1383 | value path |
| 1384 | coder |
| 1385 | path 1385 |
| 1390 | data/count |
| 1392 | code index |
| 1395 | path 1395 |
| 1400 | 24-bit to variable bit sub-sampler |
| 1401 | generic 3-bit sub-sampler |
| 1402 | generic 4-bit sub-sampler |
| 1403 | generic 8-bit sub-sampler |
| 1404 | generic 10-bit sub-sampler |
| 1410 | number of bits selector |
| 1420 | number of bits indicator |
| 1430 | 36-bit to variable bit sub-sampler |
| 1440 | 24/36 bit variable bit sub-sampler |
| 1450 | second selector |
| 1460 | selection logic |
| 1470 | selection signal |
| 1510 | decoding circuit |
| 1520 | decoded pixel values |
| 1530 | decoder pixel index |
| 1540 | image memory |
| 1600 | transmitter |
| 1610 | receiver |
| 1615 | setting control path |
| 1620 | frame sub-sampler |
| 1621 | path 1621 |
| 1630 | selected frame |
| 1632 | pixel from frame |
| 1640 | transmitter pixel sub-sampler |
| 1642 | path 1642 |
| 1650 | run length encoder |
| 1660 | settings |
| 1661 | brightness |
| 1662 | contract |
| 1663 | height |
| 1664 | width |
| 1665 | frame rate |
| 1670 | frame selector |
| 1675 | frame select indicator |
| 1680 | number of pixel bits setting |
| 1700 | run-length encoding step |
| 1710 | run-length encoded output |
| 1720 | further lossless compression step |
| 1730 | further lossless compression output |
| 1800 | unstretched frame |
| 1810 | enlarged image |
| 1820 | stretching step |

DESCRIPTION OF THE INVENTION

FIG. 1—Compression and Decompression Steps

FIG. 1 illustrates a sequence of compression steps 100 and a sequence of decompression steps 150 of the present invention. The compression steps 100 comprise a sub-sampling step 110 and an encoding step 130. After completion of the compression steps 100, a stream of encoded data 140 is output to either a storage medium or a transmission channel. The decompression steps 150 comprise a decoding step 160 wherein the stream of encoded data 140 is processed and an image reconstitution step 180.

FIGS. 2A to 2H Selecting Pixel Values for Encoding

FIGS. 2A to 2G illustrate alternatives for selecting a pixel value for encoding. The sub-sampling step 110 (FIG. 1) includes sub-sampling of a pixel value to obtain a variable selected number of bits.

Video digitizing hardware typical has the options of storing the pixel values as a 32 bit pixel value 200 or a 24 bit pixel value 210, shown in FIG. 2A and FIG. 2B, respectively. The 32 bit pixel value 200 is composed of a blue channel 202, a green channel 204, a red channel 206, and an alpha channel 208. Each channel contains of 8 bits and can represent 256 saturation levels for the particular color channel. For each channel the saturation intensity value of zero represents the fully off state, and the saturation intensity value of "255" represents the fully on state. A common alternative not shown is a sixteen bit format where the three color channels contain 5 bits each and the alpha channel is a single bit. The present invention anticipates the use of the color channels of 16 bit pixel value is a manner substantially the same as the 32-bit pixel value 200 except the number of bits per channel is 5 instead of 8.

The 24 bit pixel value 210 is composed of a blue component 212, a green component 214, and a red component 216. There is no component for the alpha channel in the 24 bit pixel value 210. Regardless of the structure, the blue channel 202 is equivalent to the blue component 212, the green channel 204 is equivalent to the green component 214, and the red channel 206 is equivalent to the red component 216.

In the present invention, the 32 bit pixel value 200 alternative is preferred due to the consistent alignment of 32 bit values in most computer memories; however for simplicity of illustration the alpha channel 208 will be omitted in FIGS. 2C to 2G.

If the video signal is digitized in color, the three color components may have different values. For example in FIG. 2C, a RGB averaging diagram 220 illustrates a blue value 222 of 35 decimal, a green value 224 of 15, and a red value 226 of 10. One alternative is to sub sample from 24 bits to 8 bits by averaging the three color values to obtain an averaged value 228 that, in this example, has the value of 20. (10+15+35)/3=20. This will produce a grayscale image. Alternatively, a color image can be preserved by sampling bits from each color component (see FIG. 8B).

FIG. 2D illustrates another alternative for selecting an 8 bit value in a blue selection diagram 230. In this example, a blue instance 232 has the value of 35, a green instance 234 has the value of 15, and a red instance 236 has the value of 10. In this alternative the blue instance 232 is always selected as a selected blue value 240.

FIG. 2E illustrates another alternative for selecting an 8 bit value in a green selection diagram 250. In this alternative the green instance 234 is always selected as a selected green value 260.

FIG. 2F illustrates another alternative for selecting an 8 bit value in a red selection diagram 270. In this alternative the red instance 236 is always selected as a selected red value 280.

If the video signal being digitized is grayscale, the three color components will have the same values. For example in FIG. 2G, a grayscale pixel 290 comprises a grayscale blue 292 with a value of decimal 40, a grayscale green 294 with a value of 40, and a grayscale red with a value of 40. Because the values are all the same, it makes no difference which grayscale color component is selected, a selected grayscale value 298 will have the value of 40 in this example.

The preferred embodiment of this invention uses the low order byte of the pixel value, which is typically the blue component as shown in FIG. 2D.

FIG. 2H illustrates a filtered pixel value 299 of 8 bits that may be selected by one of the alternatives described above. In these examples, the filtered pixel value 299 is equivalent to items referenced by numerals 228, 240, 260, 280, or 298. This reduction of the 32 bit pixel value 200 or the 24 bit pixel value 210 contributes a reduction in data size of 4:1 or 3:1, respectively. This reduction recognizes that for some images, such as medical images or grayscale images, no relevant information is lost.

For additional compression, the filtered pixel value 299 can variably select any number of bits. For example, selection of the most significant four bits instead of all eight bits filters noise that may show up in the low order bits may be very suitable for an image such as one produced by an ultrasound medical device. An example of this is shown by ZL4 804 in FIG. 8A.

Figure 3A:
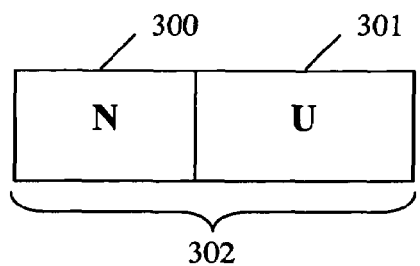
FIG. 3A shows the variable encoding format.
Figure 3B:
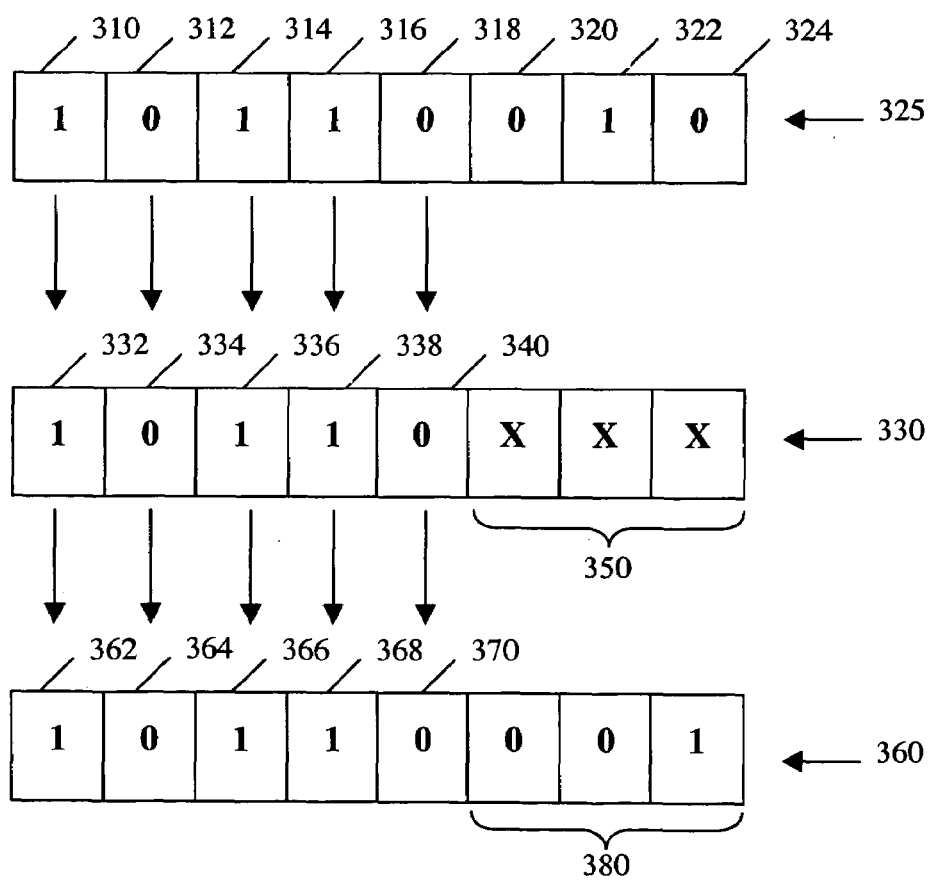
FIG. 3B shows an example of a code where N is 5 bits wide and U is 3 bits wide.

FIGS. 3A and 3B—Encoding Formats

Speed of compression and decompression may be enhanced if the algorithms fit into computer memory native storage elements such as 8 bit bytes, 16 bit words, or 32 bit double words, or some other size for which the computer architecture is optimized.

A grayscale image may be stored at a higher bit level than the actual values require. This may occur when an image is generated by an imaging technology such as radar, ultrasound, x-ray, magnetic resonance, or similar electronic technology. For example an ultrasound machine may only produce 16 levels of grayscale, requiring 4 bits of data per pixel, but the image digitizing may be performed at 8 to 12 bits per pixel. In this example, the low order bits (4 to 8) respectively provide no significant image data.

In the present invention, a fast and efficient compression and encoding method is implemented by using unused bits to store a repeat count for repeated values.

The most significant N bits of the pixel value are selected where N is the number of significant bits (determined by data analysis or by user selection). If N is less than W, where W is a native machine data type such as 8 bit byte, 16 bit word, or 32 bit double word or some other size for which the computer-architecture is optimized, then W−N equals the number of unneeded bits, U. A repeat count, C, can contain a value from 1 to CMAX where CMA is 2 to the power of U. For example, if U equals 4, C can be a number from 1 to 16. In practice the maximum value will be encoded as a zero because the high order bit is truncated. In the example, decimal 16 has a binary value "10000" will be stored as "0000".

For example, when W is 8, value pairs for N and U could include without limitation (2,6), (3,5), (4,4), (5,3), and (6,2). When W is 16, value pairs for N and U could include without limitation (2,14), (3,13), (4,12), (5,11), (6,10), (7, 9), (8, 8), (9, 7), (10, 6), (11, 5), (12,4), (13,3), and (14, 2). When W is 32, value pairs for N and U could include without limitation all combinations of values pairs for N and U where N+U equals 32 and N>1 and U>1. When W is not a multiple of 8, value pairs for N and U could include without limitation all combinations of values pairs for N and U where N+U equals W and N>1 and U>1.

FIG. 3A shows the encoded format where N 300 represent the N most significant bits of the pixel value 299, U 301 represents the bits that are not used for the data and are used for the repeat count, and W 302 where W is the width of the encoded data and equal to sum of N and U FIG. 3B illustrates bit sub-sampling where N's 300 bit width is 5, U's 301 bit width is 3, and W 302 is 8. The high order 5 bits 310–318 of an 8 bit pixel 325 are extracted to form a five bit sample 330. The lower 3 bits of 330 are ignored bits 350. In the formatted code 360, the ignored bits 350 are replaced with the repeat count value 380.

Encoding

The most significant N bits of each pixel are selected from the image to obtain value V.

In the encryption embodiment of this invention V may be used to select an encoded value, E, from the encoding table.

E is also a N-bit value. The number of elements in the encode table 1100 (FIG. 11) is 2 to the Nth power.

In the other embodiments of this invention V is used as E. E is saved as the prior value, P. For each subsequent pixel, the encoded value, E, is obtained and compared to the prior value, P. If the prior value, P, is the same as E, then a repeat counter, C, is incremented; otherwise the accumulated repeat count, C, for the prior value, P, is merged with P and placed in an array A that implements the encoded data 140 (FIG. 1) buffer. For example, if W is 8 and N is 4 and C is 10, U is 4, CMAX is 16, and ((P <<U)|C) is the merged value. If the repeat count, C, is greater CMAX, then CMAX is merged with P ((P<<U)|CMAX) and placed in the encoded data 140 (FIG. 1) buffer, A. CMAX is subtracted from C and merged values are placed in A until C is less than CMAX. All pixels are processed in this manner until the final value is compressed and encoded. The length, L, of the encoded data 140 (FIG. 1) is also placed in the encoded data 140 buffer.

Figure 4A:
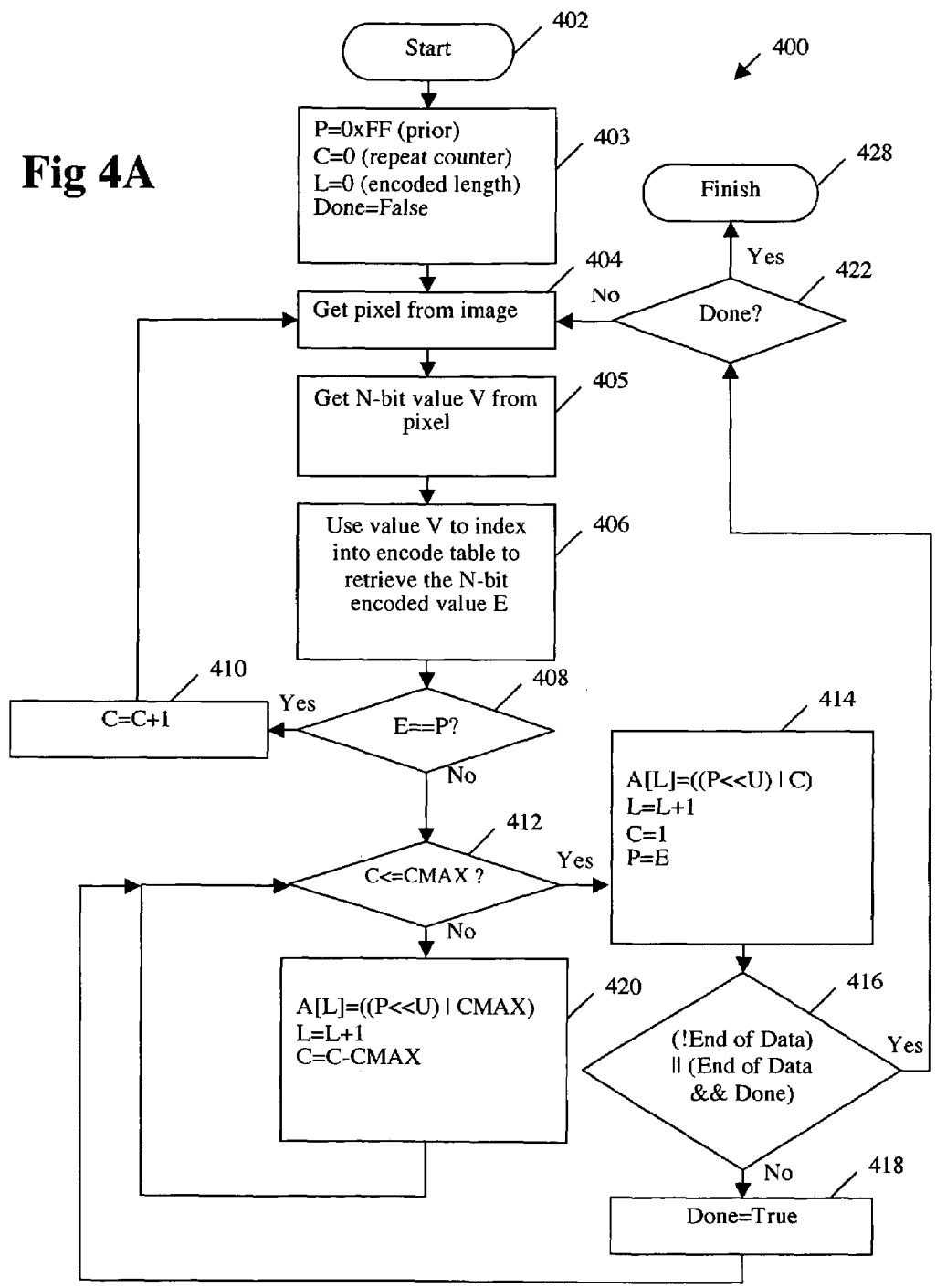
FIG. 4A shows the flowchart for the compression method.

FIG. 4A—Encode Flowchart

FIG. 4A illustrates the encode flowchart 400 which represents the details of the encryption embodiment of the encoding step 130 (FIG. 1) for the present invention.

The encoding begins at an encode entry 402. In a encode initialization step 403, a prior value P is set to a known value, preferably decimal "255" or hexadecimal 0xFF, a repeat counter C is set to zero, an encoded length L is set to 0, and a completion flag "Done" is set to a logical value of false. Next, a get pixel step 404 obtains a pixel from the image being encoded. At a get value step 405, a value V is set to the N bit filtered pixel value 299 as derived from the pixel using one of the methods shown in FIGS. 2C to 2G, preferably the fastest as explained above, and extracting the N most significant bits. At a lookup encoded value step 406, an encoded value E is set to the value of one of the codes 1105 (FIG. 11A) of the encode table 1100 as indexed by V. (In the non encrypted embodiment of this invention, step 406 is bypassed because V is used as E) Next, a compare previous 408 decision is made by comparing the values of E and P. If the values are the same, an increment counter step 410 is executed and flow continues to the get pixel step 404 that obtains the next pixel from the image.

If the encode value E does not match the prior value P, then a check count overflow 412 decision is made. If the counter C is less than or equal to CMAX, then a new code step 414 is executed, otherwise a counter overflow step 420 is executed.

At step 414, the counter C is masked and bit-wise OR-ed with P shifted left by U bit positions and is placed in the A at the next available location as indexed by the encoded length L. Then, continuing inside flowchart step 414, L is incremented, the repeat count C is set to 1 and the prior value P is set to E. After step 414, a "check end of data" decision is made by checking to see if there are any more pixels in the image, and, if not, if the last value is has been processed. Because this method utilizes a read ahead technique step 414 must be executed one more time after the end of data is reached to process the last run-length. If there is more data in the image, flow continues to a check of the completion flag "Done" at step 422. If the check indicates that the process is not completed, flow continues to step 404.

If the end of data is reached but the completion flag "Done" is still false, flow continues to a set done step 418. At step 418, the completion flag "Done" is set to logical true, and flow continues to decision 412 where the last run-length will be output and flow will eventually exit through step 414, decision 416, decision 422, and then terminate at encode exit 428.

It is possible for the repeat count C to become larger than CMAX requiring more bits than allocated by this method. This situation is handled by making the check count overflow 412 decision and executing the counter overflow step 420. At step 420, the counter C is masked and bit-wise OR-ed with P shifted left by U bit positions and is placed in the A at the next available location as indexed by the encoded length L. Then, continuing inside flowchart step 414, L is incremented, the repeat count C is decrement by CMAX. After step 420, flows continues to the check count overflow 412 decision. Thus when the encode value E repeats more that CMAX times, multiple sets of repeat counts and encoded values are output to the encoded data 140 buffer.

This entire process is repeated for each image or video frame selected during optional image sub-sampling (see 110 in FIG. 1) and the encoded length L is transmitted with the encoded data associated with each frame. The encoded length varies from frame to frame depending on the content of the image being encoded.

Figure 4B:
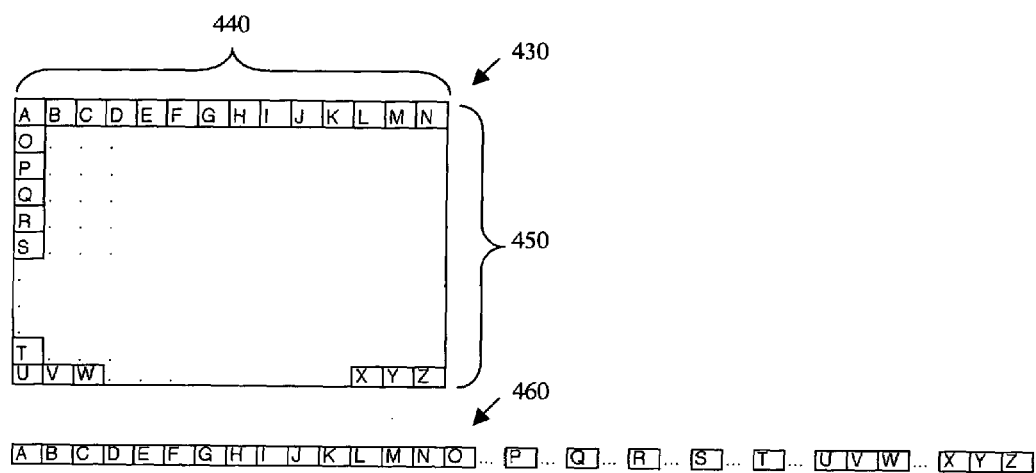
FIG. 4B shows an image and a corresponding stream of pixels.

FIG. 4B—Image and Pixel Stream

FIG. 4B illustrates an image and its corresponding stream of pixels. A rectangular image 430 is composed of rows and columns of pixels. The image 430 has a width 440 and a height 450, both measured in pixels. In this illustrative embodiment, pixels in a row are accessed from left to right. Rows are accessed from top to bottom. Some pixels in the image are labeled from A to Z. Pixel A is the first pixel and pixel Z is the last pixel. Scanning left to right and top to bottom will produce a pixel stream 460. In the pixel stream 460, pixels A and B are adjacent. Also pixels N and O are adjacent even though they appear on different rows in the image. If adjacent pixels have the same code the process in FIG. 4A will consider them in the same run.

Because the video signal being digitized is analog there will be some loss of information in the analog to digital conversion. The video digitizing hardware can be configured to sample the analog data into the image 430 with almost any width 440 and any height 450. The present invention achieves most of its effective compression by sub-sampling the data image with the width 440 value less than the conventional 640 and the height 450 value less than the convention 480. In a preferred embodiment of the invention, for use in a medical application with T1 Internet transmission bandwidth, image dimensions are sub-sampled at 320 by 240. However a image dimension sub-sampling resolution of 80 by 60 may be suitable for some video application.

Figure 5A:
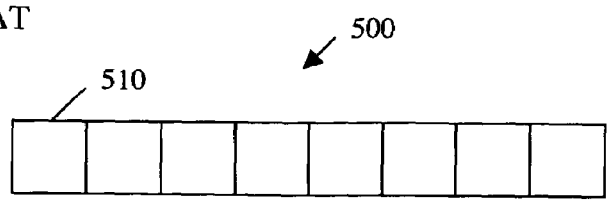
FIGS. 5A to 5C shows the formats for the run-length encoding of the RHN method.
Figure 5B:
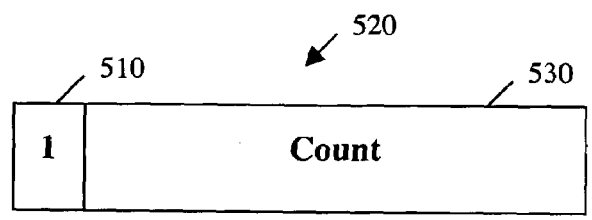
Figure 5C:
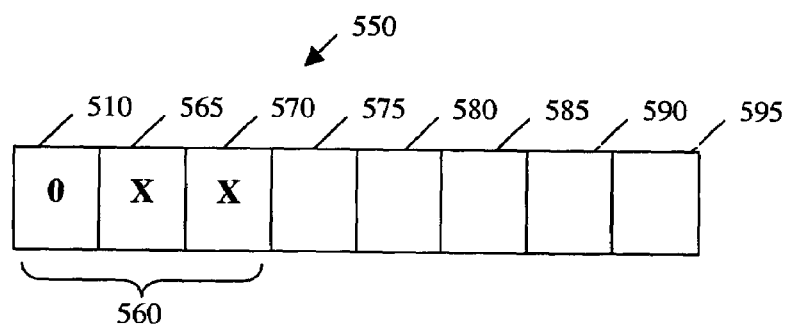

FIGS. 5A to 5C—Run-Length Encoding Formats of the RHN Method

FIGS. 5A to 5C show use of a different structure than the present invention. FIGS. 5A to 5C show the formats for the run-length encoding of RHN. In FIG. 5A, a code byte 500, with its high order bit designated as a flag bit 510.

FIG. 5B shows a repeat code 520 comprising a Boolean value one in its flag bit 510 and a 7 bit count 530 in the remaining 7 low order bits. The seven bit count 530 can represent 128 values with a zero representing "128" and 1 through 127 being their own value.

FIG. 5C shows a data code 550 comprising:
1. a Boolean value zero in its flag bit 510
2. two unused data bits: data bit 6 reference by 565 and data bit 5 reference by 570, and
3. five bits, data bits 4 to 0, reference by 575, 580, 585, 590, and 595, respectively.

FIG. 5C shows that in every byte of the RHN data code 550 two bits are unused and one bit is used for the flag bit, so that only five of the eight bits are used for data. The remaining three bits are wasted bits 560. The present invention uses a different structure by placing the repeat count in bits that the RHN format would not have used for data (U).

The corresponding ZLN format, ZL5 (where N is 5, U is 3, and W is 8), always uses five bits for data and the remaining 3 bits for the repeat count. In practice, repeat counts are small and often can fit in 3 bits, so this embodiment of the present invention will result in superior compression performance over the RHN method.

In addition, the present invention provides for a larger count when the bit filtering is larger. For example, the alternate ZLN format where each byte contains 4 data bits, ZL4 (where N is 4 and U is 4), allows for a four bits of repeat count. For example, in practice, ZL4 is superior to RHN on a typical ultrasound image containing 16 shades of gray.

Figure 6:
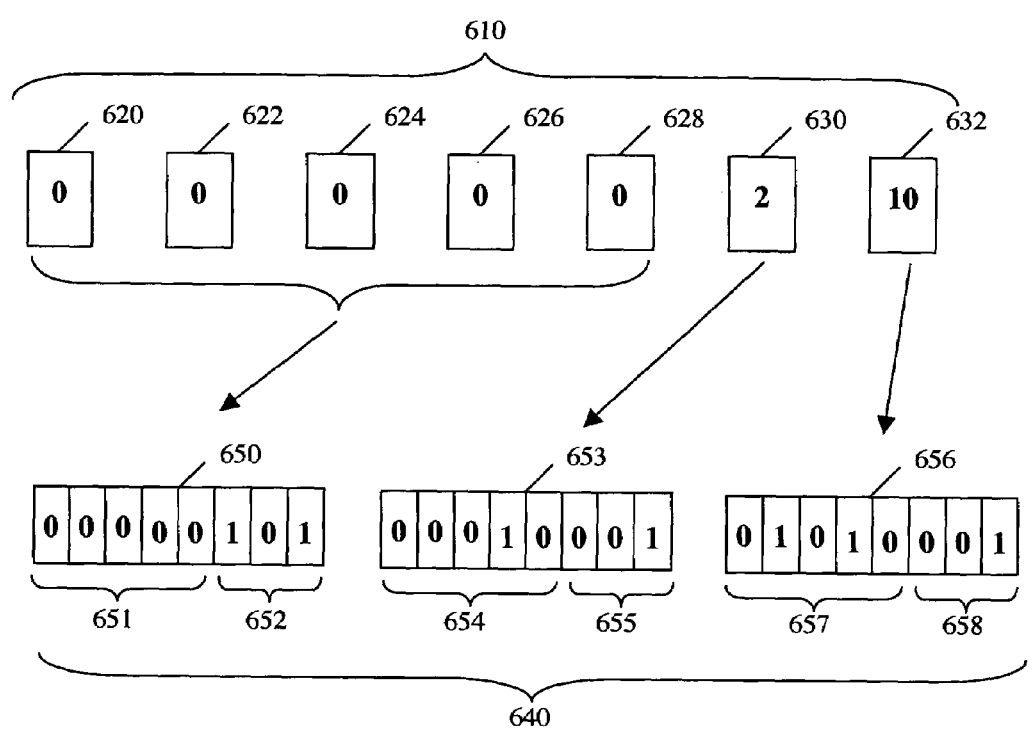
FIG. 6 shows a series of codes and the resulting encoded stream.

FIG. 6—Encoded Data Stream

FIG. 6 shows a series of decimal values 610 comprising a first value 620 equal to decimal 0, a second value 622 equal to 0, a third value 624 equal to 0, a fourth value 626 equal to 0, a fifth value 628 equal to 0, a sixth value 630 equal to 2, and a seventh value 632 equal to 10. After the encoding step 130 (FIG. 1), the corresponding encoded data 140 (FIG. 1) would be compressed down to three bytes of binary code 640 comprising a first byte 650, a second byte 653, and a third byte 656 each containing a merged value and count, (651, 652), (654, 655), and (657, 658), respectively. The first data 651 has a binary value of "00000" which equals the repeated decimal value zero. The first count 652 has a binary value "101" which equals decimal five representing the run-length of the repeating value in the first five of the decimal values 610. The second data 654 has a binary value of "00010" which equals the non-repeated decimal value two. The second count 655 has a value of 1. The third data 657 has a binary value of "01010" which equals the non-repeated decimal value ten. The third count 658 has a value of 1.

Figure 7:
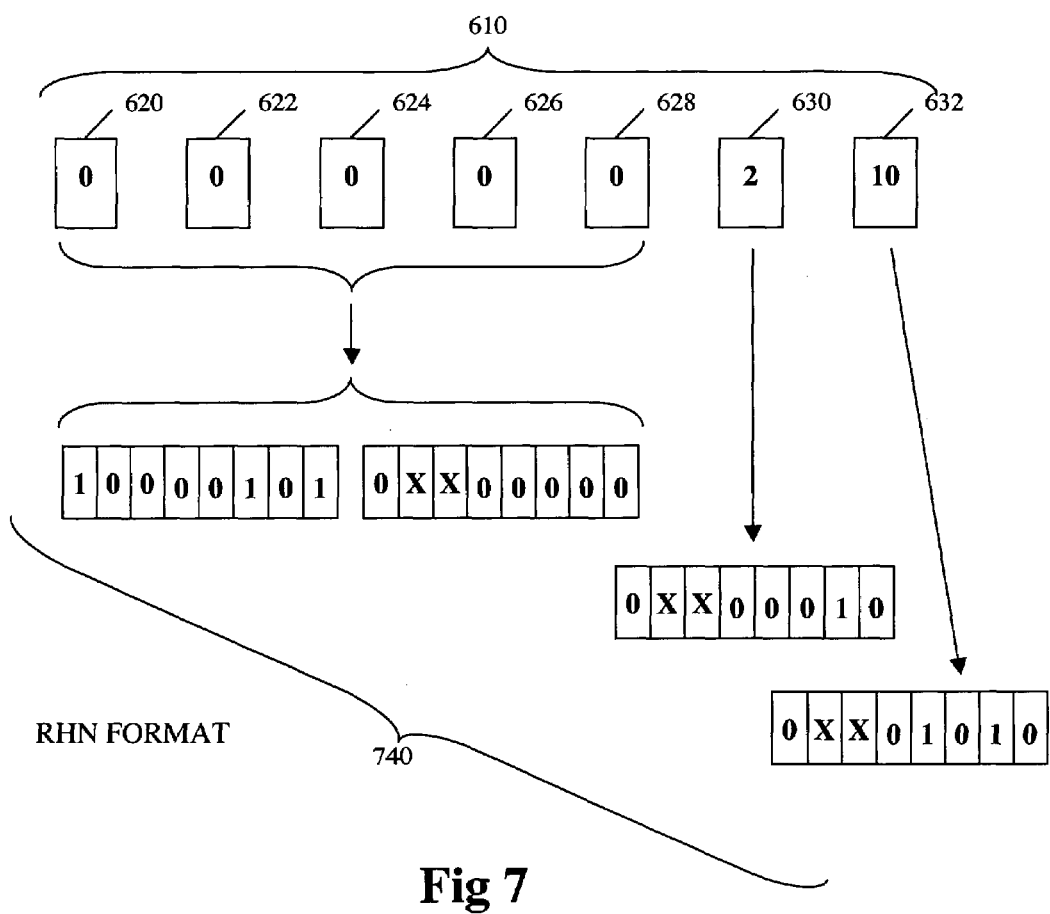
FIG. 7 shows a series of codes and the resulting encoded stream of the RHN method.

FIG. 7—RHN Codes and Encoded Stream

FIG. 7 shows the same series of decimal values 610 (FIG. 6) comprising the first value 620 equal to decimal 0, the second value 622 equal to 0, the third value 624 equal to 0, the fourth value 626 equal to 0, the fifth value 728 equal to 0, the sixth value 730 equal to 2, and the seventh value 732 equal to 10. After encoding by RHN, the corresponding encoded data 140 (FIG. 1) would be compressed down to four bytes of RHN binary code 740.

The embodiment of the present invention shown in FIG. 6 only requires three bytes to encode the same data. In this example, the present invention is 25% better than the RHN format.

Figure 8B:
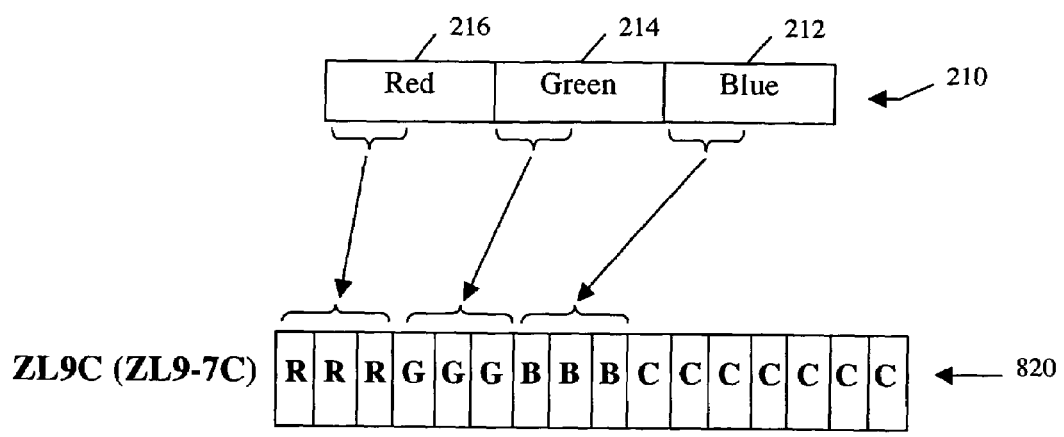
FIG. 8B shows a format that preserves 9 bits of color.

FIGS. 8A and 8B—ZLN Formats

The ZLN method of the present invention provides for variable formats. The values of N 300, U 301 and W 302 can by dynamically changed between frames. For ease of communication a format is named with the prefix "ZL" and a digit representing the value of N. For example, "ZL5" refers to a format where bit width of N is equal to 5. There are multiple values of U depending of the W. To also specify the bit width of U a hyphen and a number can be appended. For example, "ZL5-13" represents a format where N=5 and U=13. "ZL5-3" is a common format and may be imprecisely referred to as "ZL5."

FIG. 8A shows a number of formats with adjacent labels: ZL3 803, ZL4 804, ZL5 805, ZL8 808, ZL9 809, and ZL12 812. Data bits are represented by "D," and count bits are represented by "C".

FIG. 8B shows how the most significant 3 bits of each color component (216, 214, and 212 of FIG. 2B) are extracted and formatted in ZL9-7C format (the "C" append indicates that the color is preserved). With three red bits represented by "R", three green bits represented "G" and three blue bits represented by "B".

Decoding

To decode the compressed array, the decoder has a decode table that corresponds with the encode table. For W*4 bit color pixels, the decode table contains the appropriate alpha, red, green, and blue values. For W*3 bit color pixels, the alpha value is not used. The compressed array is processed W bits at a time as X. The repeat count, C, is extracted from X by masking off the data value (C=X & (((2N)−1)<<U)). The encoded value, E, is extracted from X by masking off the count (E=X & ((2U)−1)). The encoded value, E maybe used to index into the decryption. The decoded pixels are placed in a reconstructed image and repeated C times. Each element of the compressed array, A, is processed until its entire length, L, has been processed.

Figure 9:
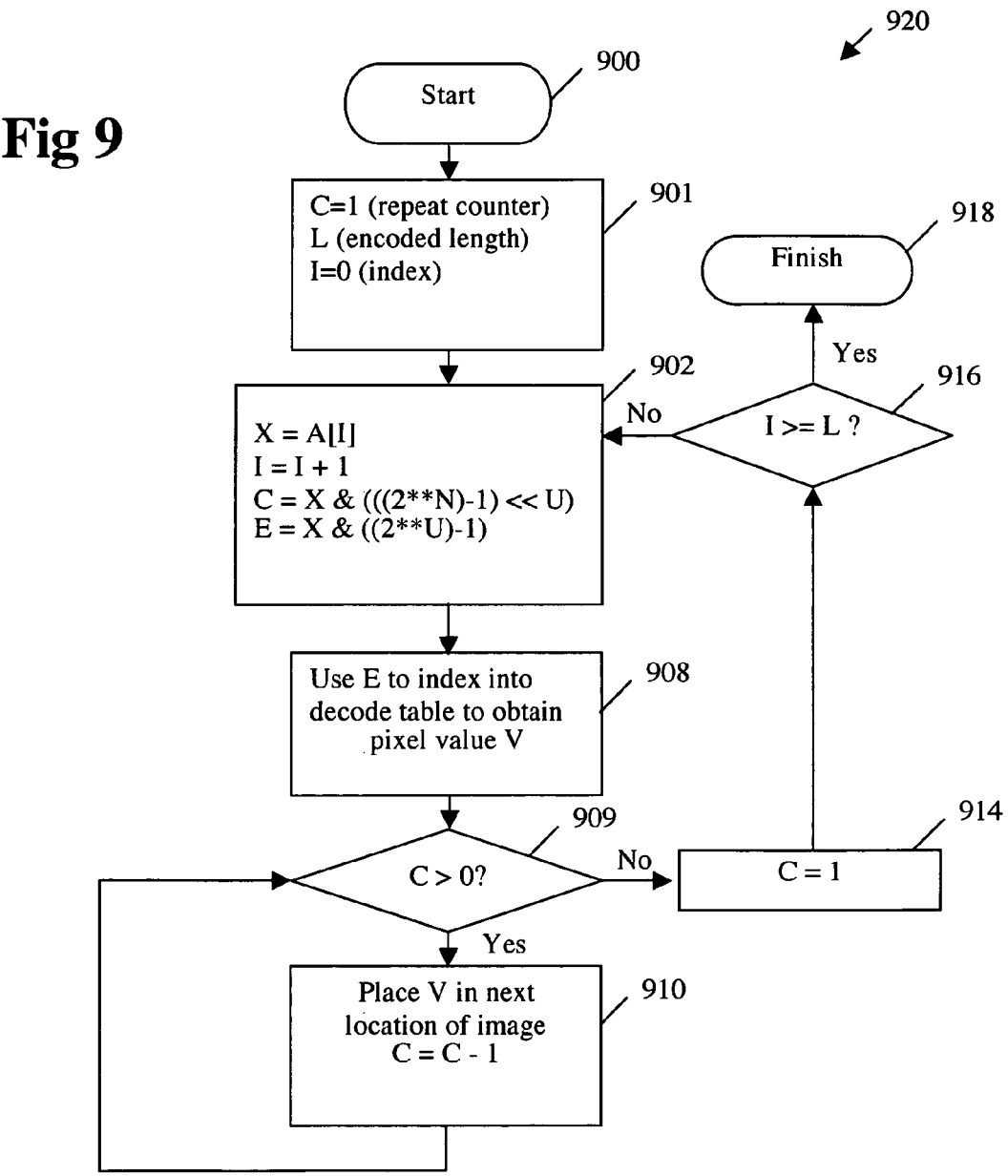
FIG. 9 shows the flow chart for the decompression method.

FIG. 9—Decode Flowchart

FIG. 9 illustrates the decode flowchart which presents the details of the decryption embodiment of the decode step 160 (FIG. 1) and the image reconstitution step 180 (FIG. 1).

The decoding beings at a decode entry 900. In a "decode initialization" step 901, a repeat counter C is set to one, an encoded length L is set to the value obtained with the encoded data 140 (FIG. 1), and an index I is set to 0. Next, a "get code" step 902 obtains a signed byte X from the encoded data 140 (FIG. 1) array A. The index I is incremented. The count (for example the 3-bit count 380 as shown in FIG. 3B) is extracted from X by masking off the data bits and placed in the repeat counter C (C=X & ((2N)−1<<U). The value of E is extracted from X by masking off the count bits (E=X & (2U)−1). In practice, the count mask and value mask can be pre-computed with the following two lines of code in the C programming language:

valueMask =−1<<U;
countMask=~valueMask;

In this illustrative decryption embodiment of the present invention, flow goes to a "decode lookup" step 908 where the value of E is used to index into the decode table 1110 (FIG. 11) to obtain a pixel value V. In the other embodiments where E is not encrypted, E is used as V and step 908 is bypassed. Flow continues to a "check zero count" 909 decision.

The 909 decision always fails the first time ensuring that a place pixel step 910 is executed. The place pixel step 910 places the pixel value V in the next location of the decompressed image and decrements the repeat counter C and returns to the 909 decision. The pixel value V is placed repeatedly until C decrements to zero. Then the 909 decision branches flow to a "reset counter" step 914. At step 914 the repeat counter is reset to 1.

Flow continues to the "check length" 916 decision where the index I is compared to the encoded length L to determine if there are more codes to be processed. If I is less than L flow returns to step 902, otherwise the decode process terminates at a "decode exit" 918.

The entire decode process is repeated for each encoded frame image.

Figure 10:
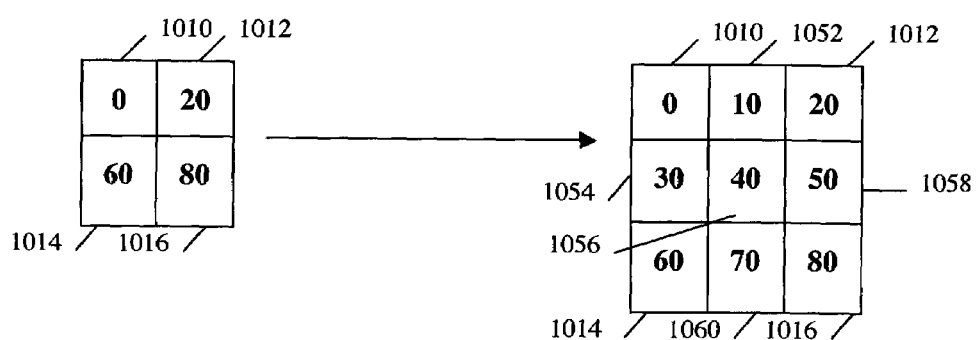
FIG. 10 shows image stretching by interpolation.
Figure 12A:
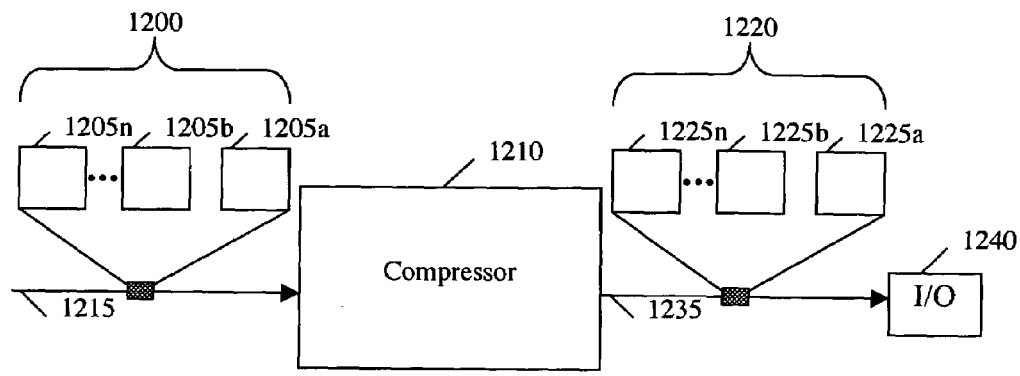
FIGS. 12A and 12B show an machines for compressing and decompressing, respectively.
Figure 12B:
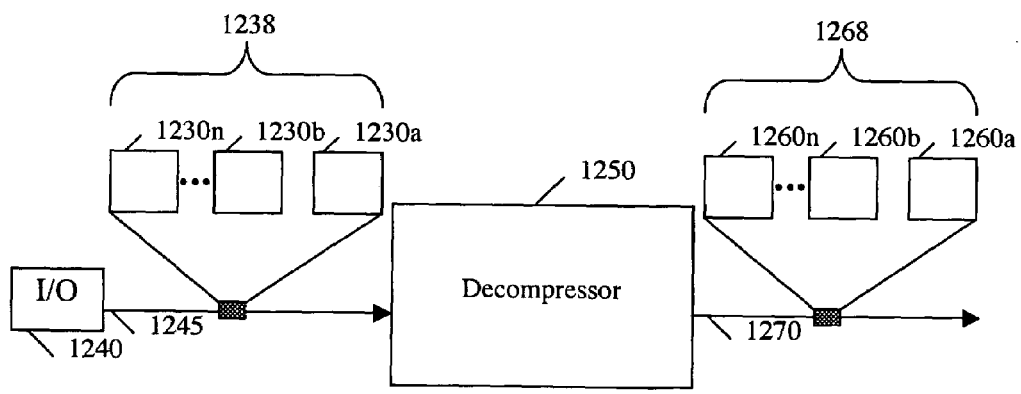
Figure 12C:
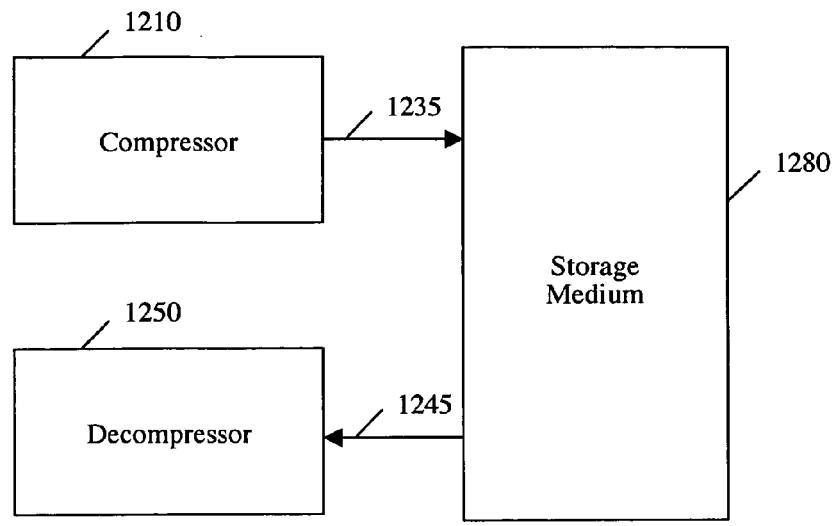
FIG. 12C shows a compressor and decompressor connected to a storage medium.
Figure 12D:
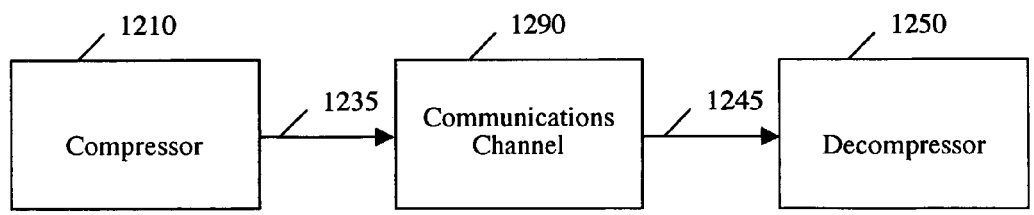
FIG. 12D shows a compressor and decompressor connected to a communications channel.
Figure 13A:
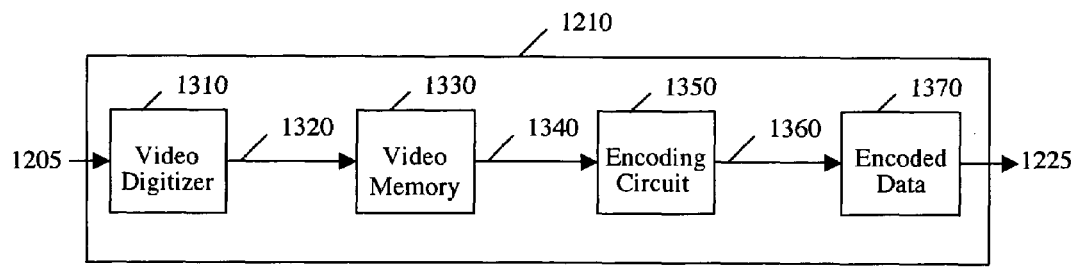
FIG. 13A shows elements of a compressor.
Figure 13B:
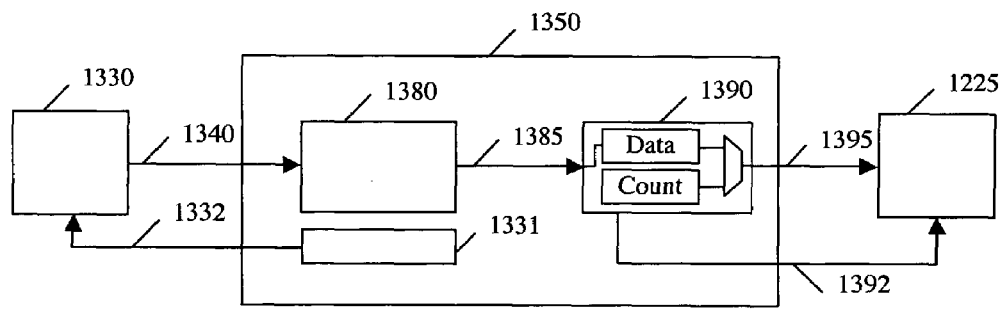
FIG. 13B shows an embodiment of an encoding circuit.
Figure 13C:
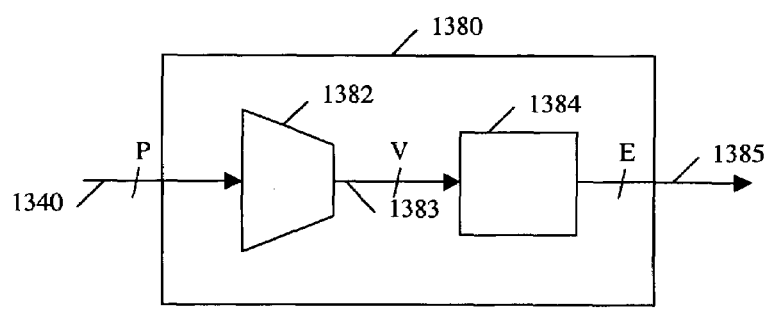
FIG. 13C shows a generic pixel sub-sampler.
Figure 13D:
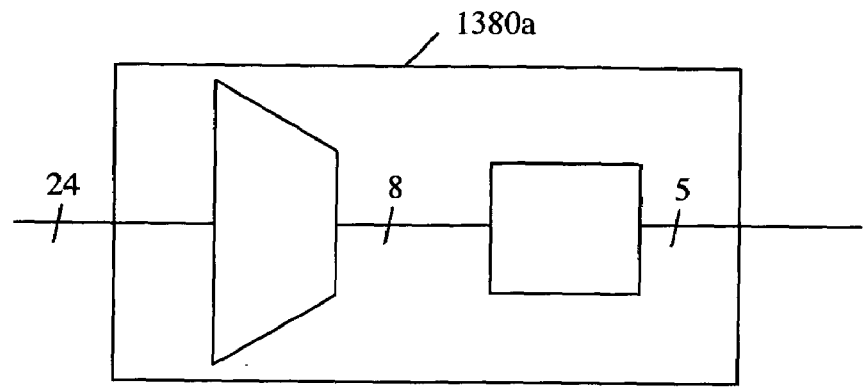
FIGS. 13D through 13J show embodiments of pixel sub-samplers.
Figure 13E:
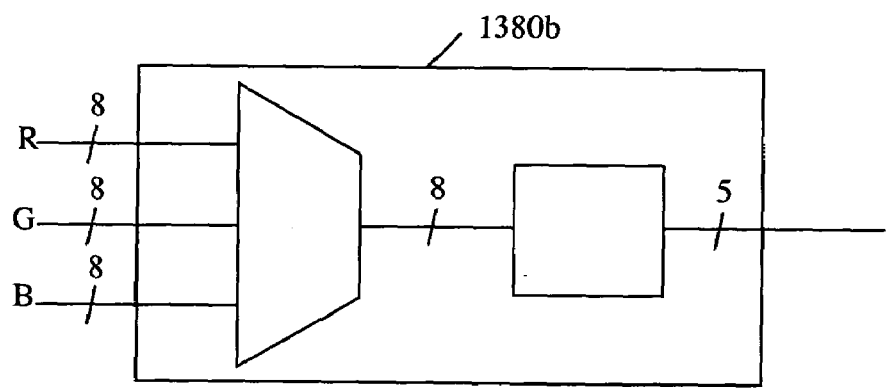
Figure 13F:
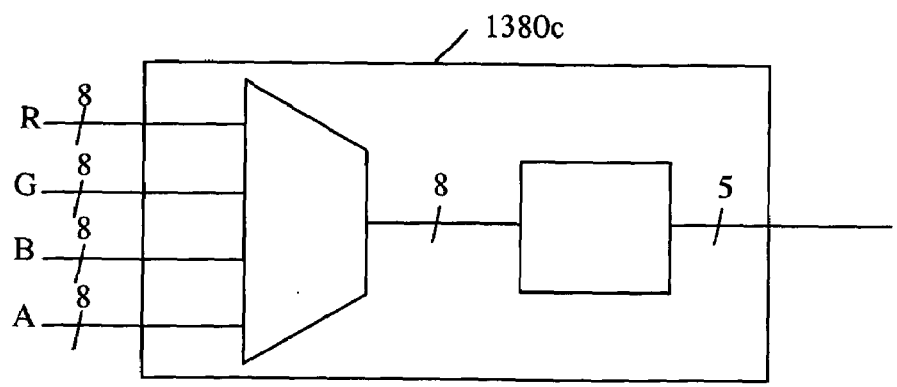
Figure 13G:
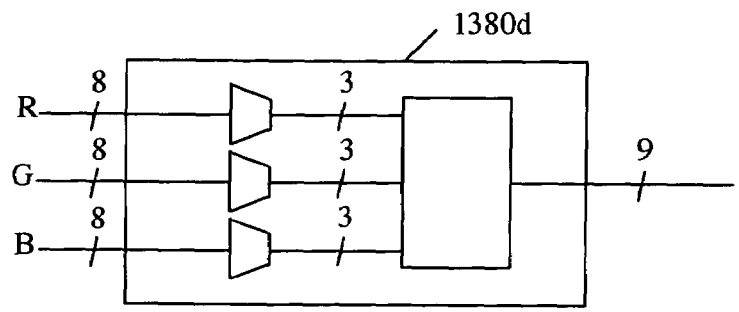
Figure 13H:
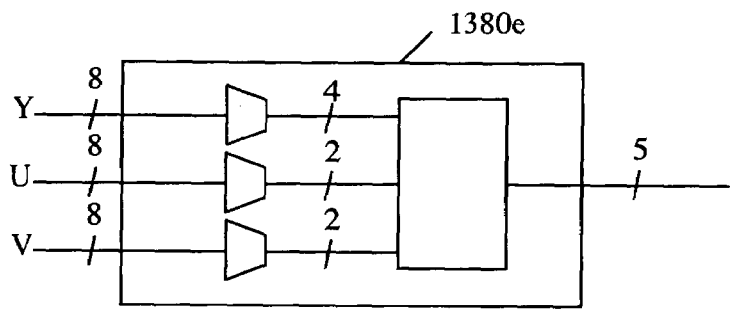
Figure 13I:
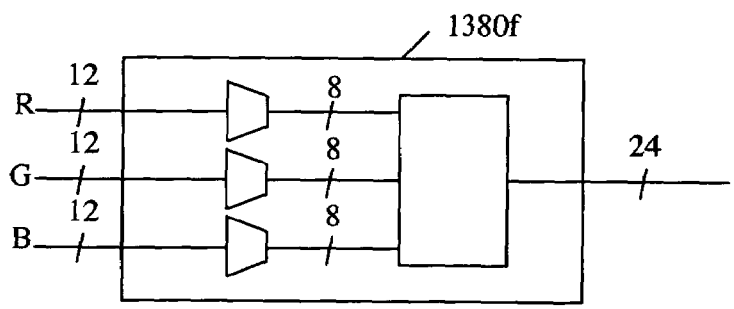
Figure 13J:
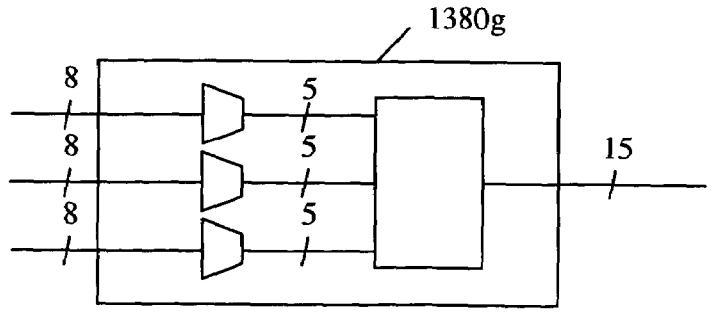
Figure 14B:
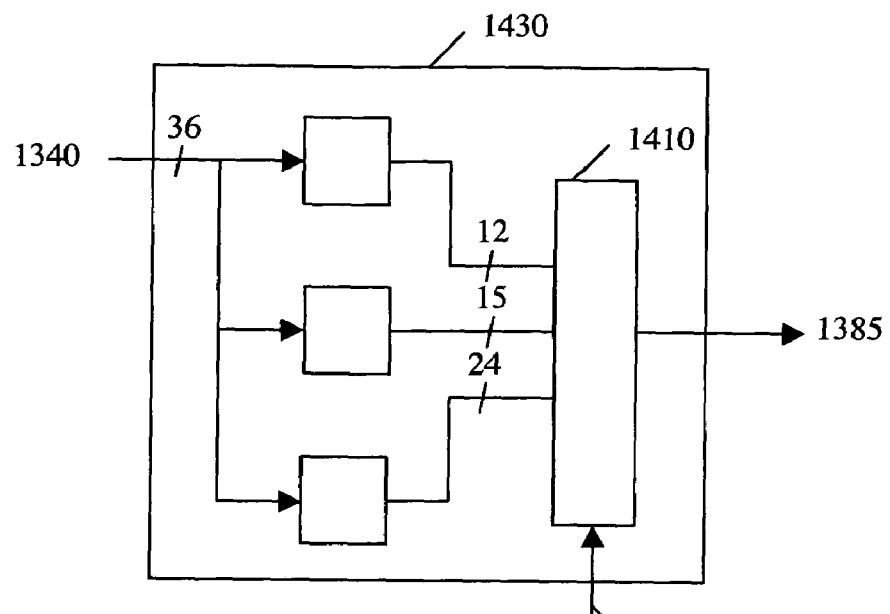
Figure 14C:
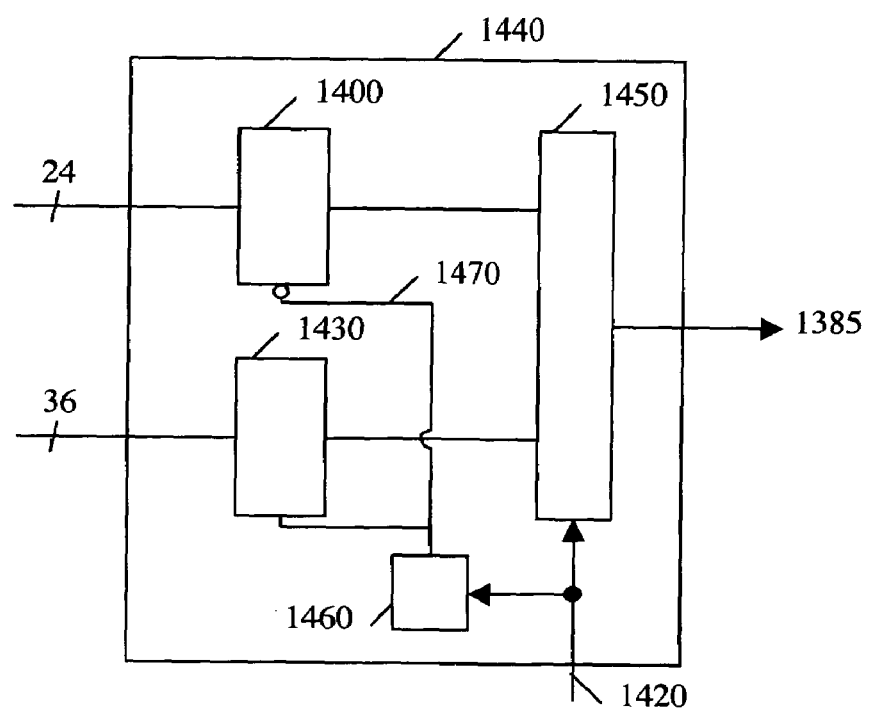
Figure 15:
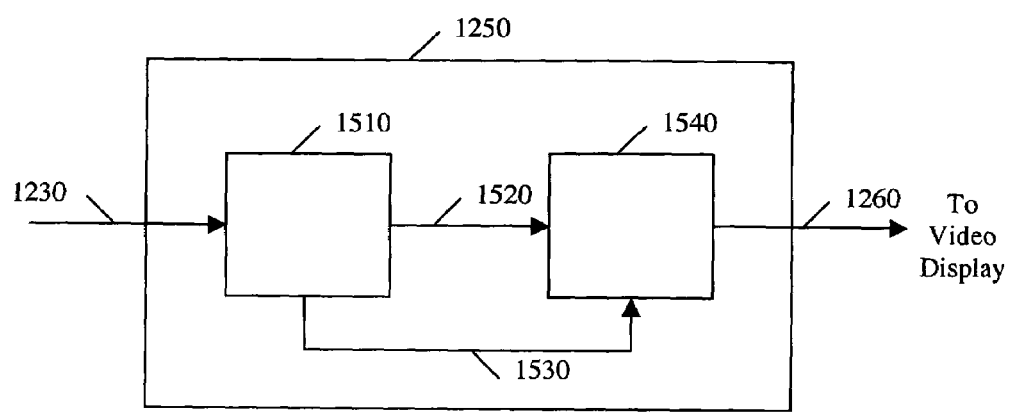
FIG. 15 shows elements of a decompressor.
Figure 16A:
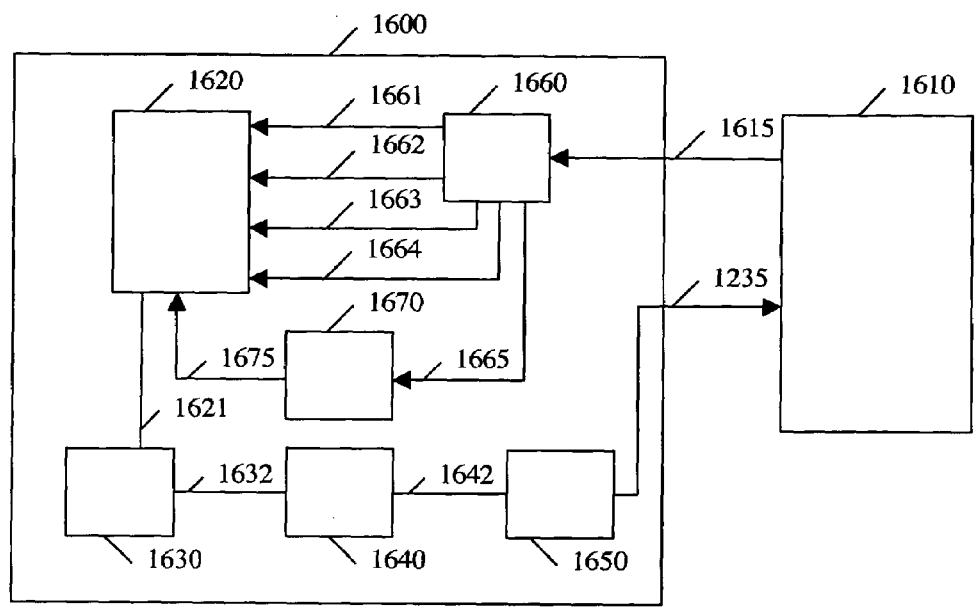
FIG. 16A shows elements for setting width, height, frame rate, brightness, and contrast which are variably altered by a receiver.
Figure 16B:
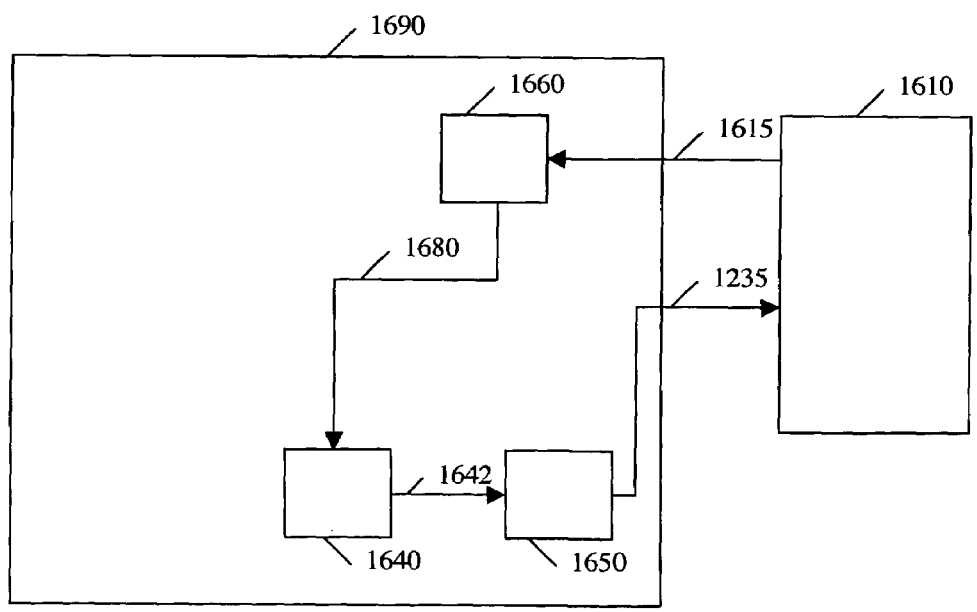
FIG. 16B shows elements for setting the number of pixel bits which are variably altered by a receiver.
Figure 17:
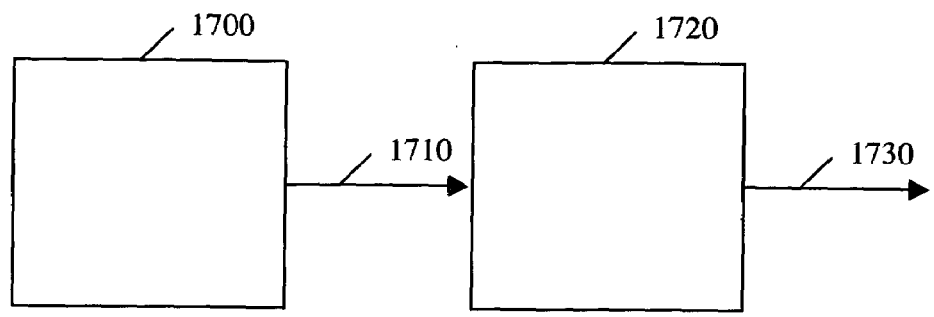
FIG. 17 shows a lossless compression step for further compression an encoded data buffer.
Figure 18:
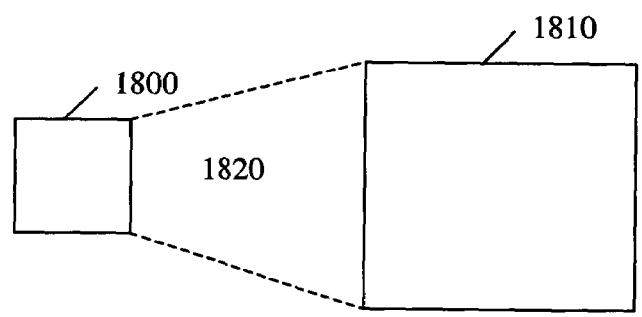
FIG. 18 shows images being enlarged by stretching.

FIG. 10—Interpolation

FIG. 10 interpolation when a two adjacent pixels 1010 and 1012 and two subsequent row adjacent pixels 1014 and 1016 are stretched to insert a new row and column of pixels.

Pixels 1052, 1054, 1056, 1058 and 1060 are inserted due to the enlargement of the image. Their values are calculated by averaging the values of the two pixels above and below or to the left or the right of the new pixel. A preferred sequence is calculation of:
1. 1052 between 1010 and 1012
2. 1054 between 1010 and 1014
3. 1058 between 1012 and 1016
4. 1056 between 1054 and 1058

Pixel 1060 can be calculated on the interpolation for the subsequent row.

FIG. 11—Encryption

By using corresponding encoding and decoding tables the data can be encrypted and decrypted without using actual values. Encryption provides a level of security for the encoded data 140 while in storage or transit.

FIG. 11 shows an example of an encryption table 1100, where N is 3 and W is 8, and a decryption table 1110, where N is 3 and U is 5.

The encode table 1100 is 2 the power of N in length. If the target color image format is W*4 bit color, then the decode table 1110 has W bits for alpha, red, green, and blue each, respectively. If the target color image format is W*3 bit color, then the alpha value is not used. If the image is W bit grayscale then only the grayscale value is used to create the decompressed and decoded image.

The corresponding table elements are mapped to each other. For example, 0 could encode to 22 as long as the $22^{nd}$ element of the decode table returns (Øxff<<24|Ø<<16|Ø<<8|Ø).

When these versions of the tables are used, the encode and decode processes and their speed of execution are substantially the same but the encoded data 140 (FIG. 1) becomes a cipher and has a higher level of security. It should be recognized by one with ordinarily skill in the art that there are other embodiments of the present invention with different encryption/decryption table rearrangements.

Advantages

Noise Filtering and Image Enhancement

The removal of the least significant bits of pixel values results in high quality decompressed images when the original image is generated by an electronic sensing device such as an ultrasound machine which is generating only a certain number of bits of grayscale resolution. By variably altering the number of most significant bits various filters can be implemented to enhance the image quality. Such a noise filter can be beneficial when the image is generated by an imaging technology such as radar, ultrasound, x-ray, magnetic resonance, or similar technology. Variations can be made to enhance the perceived quality of the decompressed image. Therefore, altering the number of data bits selected and altering the width of the repeat count is anticipated by this invention and specific values in the examples should not be construed as limiting the scope of this invention.

Dynamic Variable Formats

While a video stream is being viewed a viewer on the decoding end of the transmission can vary the settings for the compressor. Different tradeoffs between image spatial and temporal quality can be made. As the contents of the video signal change an appropriate format can be selected. Control signals can be sent back to the compressor via a communications link.

Execution Speed

The preferred embodiment of this invention use a number of techniques to reduce the time required to compress and decompress the data.

The methods require only a single sequential pass through the data. Both the compression steps 100 and the decompression steps 150 access a pixel once and perform all calculations.

When selecting the filtered pixel value 299, the preferred embodiment selects the low order byte from the 32 bit pixel value 200 or the 24 bit pixel value 210 so that an additional shift operation or addressing operation is avoided.

The shift operation is a fast and efficient way to convert a byte or word to the filtered pixel value 299.

General Purpose

The lossless compression of the sampled data achieved by the preferred embodiment of the present invention results in high quality video streams that have general purpose application in a number of areas including, without limitation, video conferencing, surveillance, manufacturing, rich media advertising, and other forms of video transmission, storage, and processing.

Lossless Nature/No Artifacts

Once the analog signal is sub-sampled and filtered to select a filtered pixel value which eliminates some of the real world defects, the methods of the present invention compress and decompress the data with no irreversible data loss. Unlike JPEG and MPEG, the decompressed image never suffers from artificially induced blocking or smearing or other artifacts that are result of the lossy compression algorithm itself. As a result even a small sub-sample of the image remains clear and true to the perceived quality of the original image.

Superior Features over RHN Format

When compared against the RHN format, the format and methods of the present invention provide a number of advantages, including, but not limited to, faster speed and smaller size of encoded data, better performance for both medical and typical video images, and a typically closer representation of the original video signal.

Conclusion, Ramification, and Scope

Accordingly, the reader will see that the compression and decompression steps of the present invention provides a means of digitally compressing a video signal in real time, communicating the encoded data stream over a transmission channel, and decoding each frame and displaying the decompressed video frames in real time.

Furthermore, the present invention has additional advantages in that:
1. it provides a means of filtering real world defects from the video image and enhancing the image quality;
2. it allows for execution of both the compression and decompression steps using software running on commonly available computers without special compression or decompression hardware;
3. it provides decompressed images that have high spatial quality that are not distorted by artifacts of the compression algorithms being used;
4. it provides a variably scalable means of video compression; and
5. it provides a means for reducing the space required in a storage medium.

Although the descriptions above contain many specifics, these should not be construed as limiting the scope of the invention but as merely providing illustrations of some of the preferred embodiments of this invention. For example, bit ordering can be altered and the same relative operation, relative performance, and relative perceived image quality will result. Also, these processes can each be implemented as a hardware apparatus that will improve the performance significantly.

Thus the scope of the invention should be determined by the appended claims and their legal equivalents, and not solely by the examples given.

I claim:

1. A machine for compressing of a plurality of video frames which make up a video signal, comprising:
   (a) a video digitizer configured to digitize a frame from said video frames;
   (b) a video memory which is able to receive a plurality of pixels from said video digitizer;
   (c) an encoding circuit for counting repeated instances of a pixel value comprising a number of pixel bits sub-sampled from each pixel when scanning said plurality of pixels and outputting a series of encoded data comprising a combined run-length field and a data field,
      wherein the data field of each encoded data element comprises a number in the range from zero to the maximum value of said number of sub-sampled bits, and
      wherein the run-length field of each encoded data element comprises the repeat count of the value in said data field;
   (d) a memory which is able to store said encoded data;
   (c) an input/output device.

2. The machine of claim 1 wherein said encoding circuit variably selects one of a set of 3, 4, 5, 8, 9, 12, 15, 16, and 24, as the number of pixel bits sub-sampled from each pixel wherein the number of pixel bits sub-sampled is less than the number of bits of the pixel being sub-sampled.

3. The machine of claim 2 wherein said pixel value is extracted from the most significant bits of each color component.

4. The machine of claim 1 wherein said input/output device is a storage medium.

5. The machine of claim 1 wherein said input/output device is a communications transmission channel.

6. A system comprising:
   c) the compressing machine of claim 5; and
   d) a decompressing machine for decompressing said series of encoded data that represents said video signal, comprising:
      i) a second input/output device for reading said series of encoded data from said communications channel,
      ii) a decoding circuit for decoding the encoded data and outputting a stream of pixel values, and
      iii) a second memory for staring a reconstituted image comprising said stream of pixel values for as frames of a video sequence.

7. The system of claim 6 wherein the number of sub-sampled bits and the number of bits in the run-length field are dynamically selected by a user viewing the video sequence at the decompressing machine.

8. The machine of claim 1 wherein said encoding circuit sub-samples nine pixel bits from each pixel, and wherein the number of pixel bits sub-sampled is less than the number of bits of the pixel being sub-sampled.

9. The machine of claim 8 wherein the nine sub-sampled pixel bits comprises three most significant bits from each color component.

10. The machine of claim 8 wherein run-length field comprises seven bits.

11. The system of claim 8 wherein the decompressing machine further comprises a display for displaying each frame of the video sequence, and wherein each frame is are enlarged by stretching prior to displaying on the display.

12. The machine of claim 1 wherein said encoding circuit sub-samples five pixel bits from each pixel, and wherein the number of pixel bits sub-sampled is less than the number of bits of the pixel being sub-sampled.

13. The machine of claim 12 wherein the five sub-sampled pixel bits comprises five bits from one color component.

14. The machine of claim 12 wherein run-length field comprises three bits.

15. A system comprising:
   a) the compressing machine of claim 1; and
   b) a decompressing machine for decompressing said series of encoded data that represents said video signal, comprising:
      i) a second input/output device for reading said series of encoded data,
      ii) a decoding circuit for decoding the encoded data and outputting a stream of pixel values, and
      iii) a second memory for storing a reconstituted image comprising said stream of pixel values for as frames of a video sequence.

16. The machine of claim 1 wherein said encoding circuit further encrypts the pixel value prior to outputting the pixel value to the data field of the series of encoded data.

17. The machine of claim 11 wherein said encoding circuit further compresses the stored encoded data with a lossless technique known in the art prior to providing the encoded data to the input/output device.

18. The machine of claim 1 wherein each digitized frame has a width less than or equal to 320 pixels and a height less than or equal to 240 pixels.

19. A storage medium in which the encoded data as claimed in claim 1 is stored.

20. A machine for compressing of a plurality of video frames which make up a video signal, comprising:
   a) a digital video means for providing a plurality of digital pixel values for each frame from said video frames;
   b) a first memory means for receiving the plurality of pixels from said digital video means;
   c) an encoding means for counting repeated instances of a pixel value comprising a number of pixel bits sub-sampled from each pixel when scanning said plurality of pixels and outputting a series of encoded data comprising a combined nm-length field and a data field,
      wherein the data field of each encoded data element comprises a number in the range from zero to the maximum value of said number of sub-sampled bits, and
      wherein the run-length field of each encoded data element comprises the repeat count of the value in said data field;
   d) a second memory means for storing said encoded data;
   e) an input/output means for outputting said stored encoded data.

* * * * *